US011035931B1

(12) United States Patent
Kipp

(10) Patent No.: US 11,035,931 B1
(45) Date of Patent: Jun. 15, 2021

(54) ACCELERATED RADAR DATA PROCESSING VIA LIMITED PULSE EXTRAPOLATION

(71) Applicant: Ansys, Inc., Canonsburg, PA (US)

(72) Inventor: Robert Kipp, Canonsburg, PA (US)

(73) Assignee: Ansys, Inc., Canonsburg, PA (US)

( * ) Notice: Subject to any disclaimer, the term of this patent is extended or adjusted under 35 U.S.C. 154(b) by 228 days.

(21) Appl. No.: 16/173,288

(22) Filed: Oct. 29, 2018

(51) Int. Cl.
*G01S 7/41* (2006.01)
*G01S 7/40* (2006.01)
*G01S 13/931* (2020.01)
*G01S 7/292* (2006.01)
*G01S 13/935* (2020.01)

(52) U.S. Cl.
CPC ............. *G01S 7/415* (2013.01); *G01S 7/292* (2013.01); *G01S 7/4052* (2013.01); *G01S 13/931* (2013.01); *G01S 13/935* (2020.01); *G01S 2007/4095* (2013.01)

(58) Field of Classification Search
CPC ...... G01S 7/415; G01S 13/935; G01S 13/931; G01S 7/292; G01S 7/4052; G01S 2007/4095
USPC .......................................................... 342/90
See application file for complete search history.

(56) References Cited

U.S. PATENT DOCUMENTS

| | | | | |
|---|---|---|---|---|
| 4,137,533 A * | 1/1979 | Briechle | ................... | G01S 7/32 342/162 |
| 5,258,941 A * | 11/1993 | Newberger | ........... | G06F 17/147 708/402 |
| 5,606,324 A * | 2/1997 | Justice | ................... | G01S 13/24 244/3.19 |
| 5,777,892 A * | 7/1998 | Nabity | ................... | G01F 1/002 702/143 |
| 6,191,727 B1 * | 2/2001 | Springer | ................. | G01S 7/021 342/13 |
| 6,437,729 B1 * | 8/2002 | Mattox | ................... | G01S 13/58 342/106 |
| 6,738,021 B2 * | 5/2004 | Benner | ................. | G01S 13/003 342/378 |
| 6,833,808 B2 * | 12/2004 | Rees | ..................... | G01S 13/534 342/159 |
| 9,268,008 B1 * | 2/2016 | Abileah | ................. | G01S 7/022 |
| 9,612,123 B1 * | 4/2017 | Levinson | ................ | G01S 17/87 |
| 2017/0082744 A1 * | 3/2017 | Matsumoto | .......... | G01S 13/584 |
| 2017/0211411 A1 * | 7/2017 | Shepard | ................. | G01S 7/354 |

* cited by examiner

*Primary Examiner* — Frank J McGue
(74) *Attorney, Agent, or Firm* — Jones Day

(57) ABSTRACT

Systems and methods are provided for a computer-implemented method for generating a display of radar returns. A geometry data structure is accessed that identifies characteristics of a region of interest including dimensions and movement of one or more objects in the region of interest. A pulse of a plurality of rays is transmitted from an antenna position into the region of interest and the velocities of returns of the rays are captured at a receiver position after the rays have interacted with the one or more objects. Each ray return is assigned into one of a plurality of bins based on the velocity of that ray. A Fourier transform is performed using the binned data to obtain a system response at discrete time intervals. The system response at the discrete time intervals is transformed into Doppler velocity data, and the Doppler velocity data is stored and displayed on a graphical user interface.

28 Claims, 45 Drawing Sheets

(a)

ACCELERATED RADAR DATA PROCESSING VIA LIMITED PULSE EXTRAPOLATION

TECHNICAL FIELD

The subject matter described herein relates to radar data processing and more particularly to accelerated radar data processing via limited pulse extrapolation.

BACKGROUND

A common technique used by radars to measure the velocity of one or more objects in their field of view is to exploit the Doppler effect for electromagnetic waves wherein moving sources, observers, and reflecting objects cause a shift in the frequency of the electromagnetic waves that are issued and observed by these radars. In implementations, the radar will issue a rapid sequence of pulse waveforms from its transmitting antenna and observe their separate responses at its receiving antenna due to reflections from the scene. If objects in the scene are moving, the neighboring responses will be similar but slightly different. By contrasting the small differences that accumulate over a whole sequence of pulses using a mathematical integral known as a Fourier transform, the radial speed of objects relative to the radar can be determined.

SUMMARY

Systems and methods described herein include a computer-implemented method for generating a display of radar returns. A geometry data structure is accessed that identifies characteristics of a region of interest that includes dimensions and movement of one or more objects in the region of interest. A pulse of a plurality of rays is transmitted from an antenna position into the region of interest and the velocities of returns of the rays are captured at a receiver position after the rays have interacted with the one or more objects. Each ray return is assigned into one of a plurality of bins based on the velocity of that ray. A Fourier transform is performed using the binned data to obtain a system response at discrete time intervals. The system response at the discrete time intervals is transformed into Doppler velocity data, and the Doppler velocity data is stored and displayed on a graphical user interface.

In another example, a computer-implemented system for generating a display of radar returns include one or more data processors and one or more computer-readable mediums encoded with instructions for commanding the one or more data processors to execute steps of a process. In the process, a geometry data structure is accessed that identifies characteristics of a region of interest that includes dimensions and movement of one or more objects in the region of interest. A pulse of a plurality of rays is transmitted from an antenna position into the region of interest and the velocities of returns of the rays are captured at a receiver position after the rays have interacted with the one or more objects. Each ray return is assigned into one of a plurality of bins based on the velocity of that ray. A Fourier transform is performed using the binned data to obtain a system response at discrete time intervals. The system response at the discrete time intervals is transformed into Doppler velocity data, and the Doppler velocity data is stored and displayed on a graphical user interface.

In a further example, a computer-readable medium is encoded with instructions for commanding one or more data processors to execute steps of a method for generating a display of radar returns. In the method, a geometry data structure is accessed that identifies characteristics of a region of interest that includes dimensions and movement of one or more objects in the region of interest. A pulse of a plurality of rays is transmitted from an antenna position into the region of interest and the velocities of returns of the rays are captured at a receiver position after the rays have interacted with the one or more objects. Each ray return is assigned into one of a plurality of bins based on the velocity of that ray. A Fourier transform is performed using the binned data to obtain a system response at discrete time intervals. The system response at the discrete time intervals is transformed into Doppler velocity data, and the Doppler velocity data is stored and displayed on a graphical user interface.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
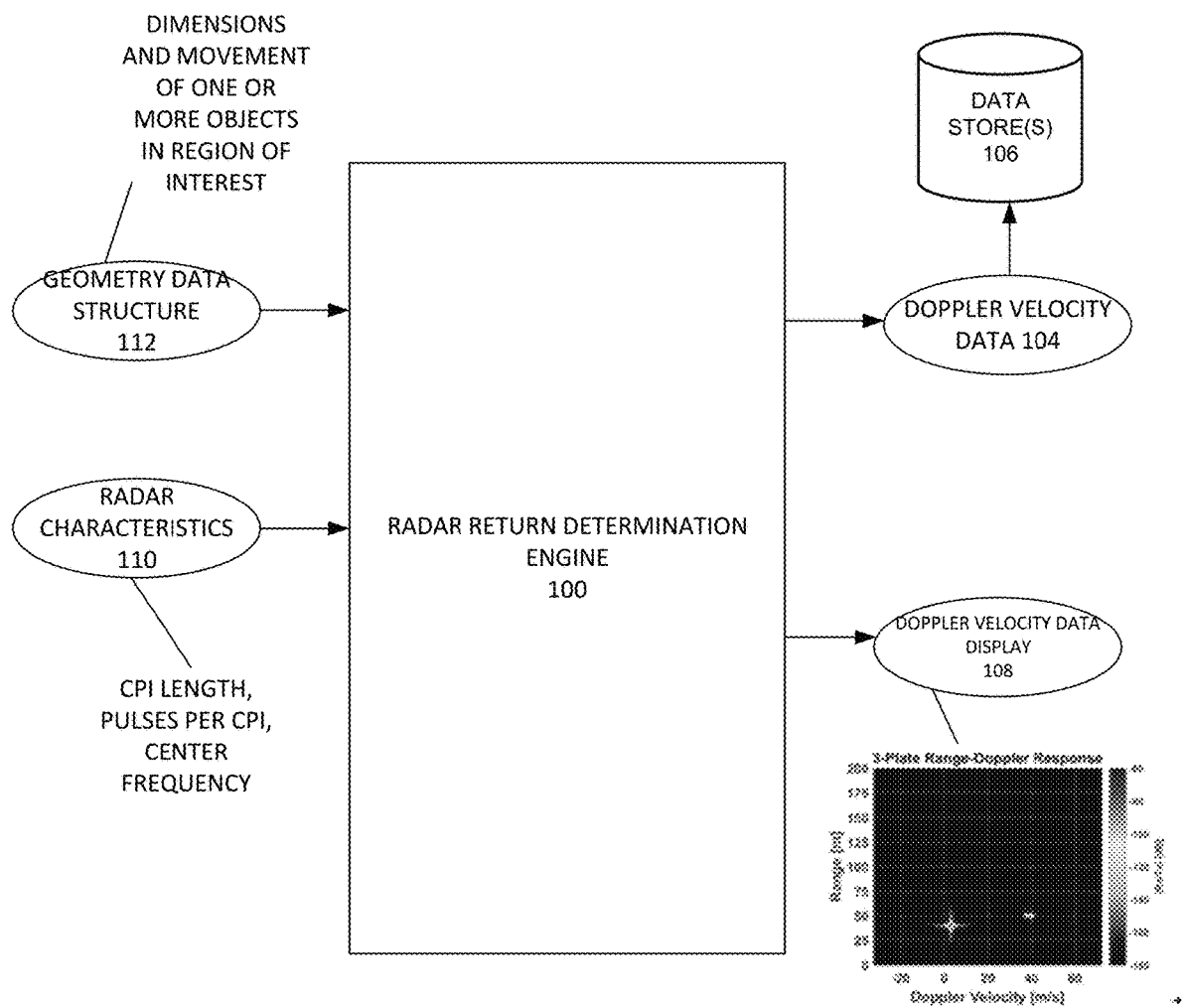
FIG. 1 is a block diagram depicting a computer-implemented radar return determination engine.

Simulation of the behavior of radars operating in a realistic 3D scene may utilize a general purpose electromagnetic simulation software that can handle complex 3D geometry. The typical way to deploy the simulation would be to perform a separate simulation for each radar pulse in a sequence of "snapshots" while updating the positions and orientations of the radar and scene objects according to their linear and rotational velocities and the time interval between radar pulses between each of snapshot. The separate snapshot results could then be collected and processed in the same way they would be on the physical radar to obtain velocity information. If the radar sequence has N pulses, then there would be N separate simulations. All other things being equal, such a brute force simulation would require N times as much processing power (e.g., simulation time) as simulating just a single radar pulse.

However, simulation of a physical system has a key advantage over the actual observation of a physical system: knowledge of the characteristics (e.g., size, position, movement) of the scene objects before the simulation is run. Systems and methods as described herein exploit knowledge of the moving objects that are input to the simulation to extrapolate the radar system response from a single pulse to N neighboring pulses without having to perform the computational work of separately simulating the N radar pulses. While the real radar measures object velocities using the technique described above, a simulation can know this scene object characteristic information a priori as a simulation input and exploit this additional information to extrapolate the radar system response from 1 pulse to N neighboring pulses.

Certain systems and methods described herein utilize extrapolation techniques in conjunction with an electromagnetic simulation technique known as ray-tracing. In certain ray-tracing simulation techniques, many rays (e.g., one million or more) are launched from the radar transmitting antenna and tracked by the simulation as they interact with the scene. Each ray represents a local portion of the electromagnetic wave broadcast by the radar transmitter. The rays are assigned an initial weight according to the radar transmitting antenna pattern, and interactions of the rays with objects in the 3D scene are simulated, leading to reflections and, in some cases, multi-bounce. At each ray bounce, there is some, often small, contribution back to the radar receiving antenna. These individual ray contributions are accumulated across all of the rays transmitted and tracked by the simulation.

To extrapolate the response to N neighboring pulses in one embodiment, the ray path lengths are stretched or compressed according to the velocity of the radar and objects in the scene. For each pulse, the ray contributions are re-summed using these adjusted path lengths. Because each ray is a local representation of a propagating electromagnetic wave, the principal effect of these path-length adjustments is to change how the many ray contributions constructively or destructively interfere with each other when they are summed up at the receiving antenna.

This ray-stretching technique, by itself, can provide an improvement in simulation time over the brute force approach. The rays are only shot once per pulse sequence group instead of N times for the N pulses in the sequence group. In such an approach, the computer memorizes geometric and response contribution details about M rays, where M can measure in the millions. Further, at each pulse time step, the computer adjusts M path lengths and then sums up their M adjusted contributions. Hence, to perform the extrapolation after the ray tracing has completed, the computer performs MN operations. In one embodiment, further acceleration can be achieved in the reprocessing of the path-length adjusted rays through utilization of the Fast Fourier Transform (FFT).

Specifically in one embodiment, instead of adjusting and re-summing the M ray contributions for each radar pulse in the sequence, systems and methods instead accumulate the M ray contributions into L "velocity bins." Each bin represents a small range of values for the rate of change in the ray path length, identified as the "ray velocity." Rays issued from faster-moving radars or encountering faster-moving objects will have a higher-magnitude ray velocity, which means their path length will change more rapidly with time. Positive ray velocity corresponds to a ray getting compressed, while negative velocity implies a ray getting stretched. The ray velocity can be computed using mathematical techniques informed by the input velocities of the radar and scene objects while the ray is being traced through one or more bounces. Once the ray's contribution to the radar received signal has been determined using a ray-tracing simulation methodology, this contribution is accumulated in the velocity bin most closely matching the ray's velocity (i.e., the ray's path-length rate of change).

In certain embodiments, at the beginning of the simulation, the L velocity bins are set up to be uniformly spaced, meaning each bin accumulates ray contributions from the same range of possible ray velocities. In one example, each velocity bin is configured to be 0.25 m/s wide, with Bin 1 accumulating contributions from rays with velocities ranging from −100 m/s to −99.75 m/s, while Bin 2 covers −99.75 to −99.5 m/s, and so on out to Bin 800, which accumulates rays with velocities ranging from +99.75 to +100 m/s. In this example, the velocity bins span 200 m/s and L=200 m/s/0.25 m/s=800. It is desirable in some implementations for the velocity bins to be configured to collectively span all possible ray velocities that will be encountered during the simulation, and this can be determined from the known velocities of each object in the scene relative to the radar. To limit introduction of numeric noise, the density of ray bins in one example is at least four times the Doppler velocity resolution of the radar being simulated. Hence, if the radar is capable of resolving Doppler velocities to a resolution of 1 m/s, then each of the uniformly spaced velocity bins spans no more than 0.25 m/s.

After the ray contributions have been accumulated in the L velocity bins, the velocity bins can be Fourier transformed to extrapolate the radar response to neighboring pulse times. Because the velocity bins are uniformly spaced, the Fourier transforms can be performed very efficiently using an FFT. In one embodiment, the ray-tracing simulation is performed for a pulse in the middle of the radar pulse sequence, meaning that the radar and scene objects are positioned according to the time when the middle pulse leaves the radar. A single forward FFT (FFFT) can be used to generate the response to all pulses issued earlier than the central pulse. A single inverse FFT (IFFT) can be used to generate the response to all pulses issued later than the central pulse. The response to the central pulse itself can be obtained from either the output of the FFFT or the IFFT, as it will be the same. The computational cost of performing an FFFT and IFFT on a data series comprising L velocity bins is negligible when compared to summing of MN adjusted ray contributions because L will number in the low thousands while M can easily number in the millions and N can number in the hundreds (i.e., MN is on the order of 100 million operations). By comparison, the costs of the FFFT and IFFT are each L log(L) each: L log(L)>>MN.

Systems and methods as described herein may include other benefits as well, whether further accelerated using (I)FFTs or not. For example, the brute force approach tends to produce artifacts and elevated noise when the radar response is plotted versus Doppler velocity. Comparing between pulses, most of the ray tracks are the same, with the exception that they have slightly different path lengths, the effect associated with certain extrapolation techniques described herein. However, because of small changes in the scene geometry, a few of the ray tracks may be completely different. That is, those ray tracks hit different objects and may even encounter a different number of bounces than their corresponding predecessors or successors in neighboring radar pulses. This loss of ray track correspondence with small variations in the geometric configuration is referred to as "ray jitter". Normally, since the number of rays (N) is very large and each ray contributes only a small amount to the composite radar response, this small difference in a handful of rays across the pulse sequence might only make a small difference in the final results. But when the pulse sequence is converted into a response vs. Doppler velocity using a Fourier transform, the noise introduced by this discontinuous ray behavior may amplified. With an actual radar, the ray jitter effect is not observed because, in reality, there are no such things as rays and electromagnetic waves have a more continuous behavior. But when the electromagnetic waves are necessarily discretized into rays using this underlying ray-tracing technique, this type of discretization noise is prominently manifested in the predicted Doppler velocity response. By extrapolating neighboring pulse responses from a single ray set, certain systems and methods described herein directly address this problem with certain ray-tracing techniques.

FIG. 1 is a block diagram depicting a computer-implemented radar return determination engine. The radar return determination engine 100 generates Doppler velocity data 104 that is stored in a data store 106 and provided for display on a graphical user interface at 108. The radar return determination receives characteristics 110 of a radar (e.g., a known radar system or a radar system being designed for future fabrication) to be simulated, including details such as radar type, radar waveform, length of a coherent processing interval (CPI) of the radar, a number of pulses per CPI, and a frequency of the radar. The radar return determination engine 100 further receives a geometry data structure 112 that includes characteristics of a region of interest. Those characteristics may include dimensions and movement (e.g., linear and rotational movement) of one or more objects in the region of interest. Based on the radar characteristics 110 and the geometry data structure 112, the radar return determination engine 100 simulates the resulting data and displays its prediction of that which would be generated by a corresponding physical multi-pulse radar system, storing and outputting those simulated data and displays.

Figure 2:
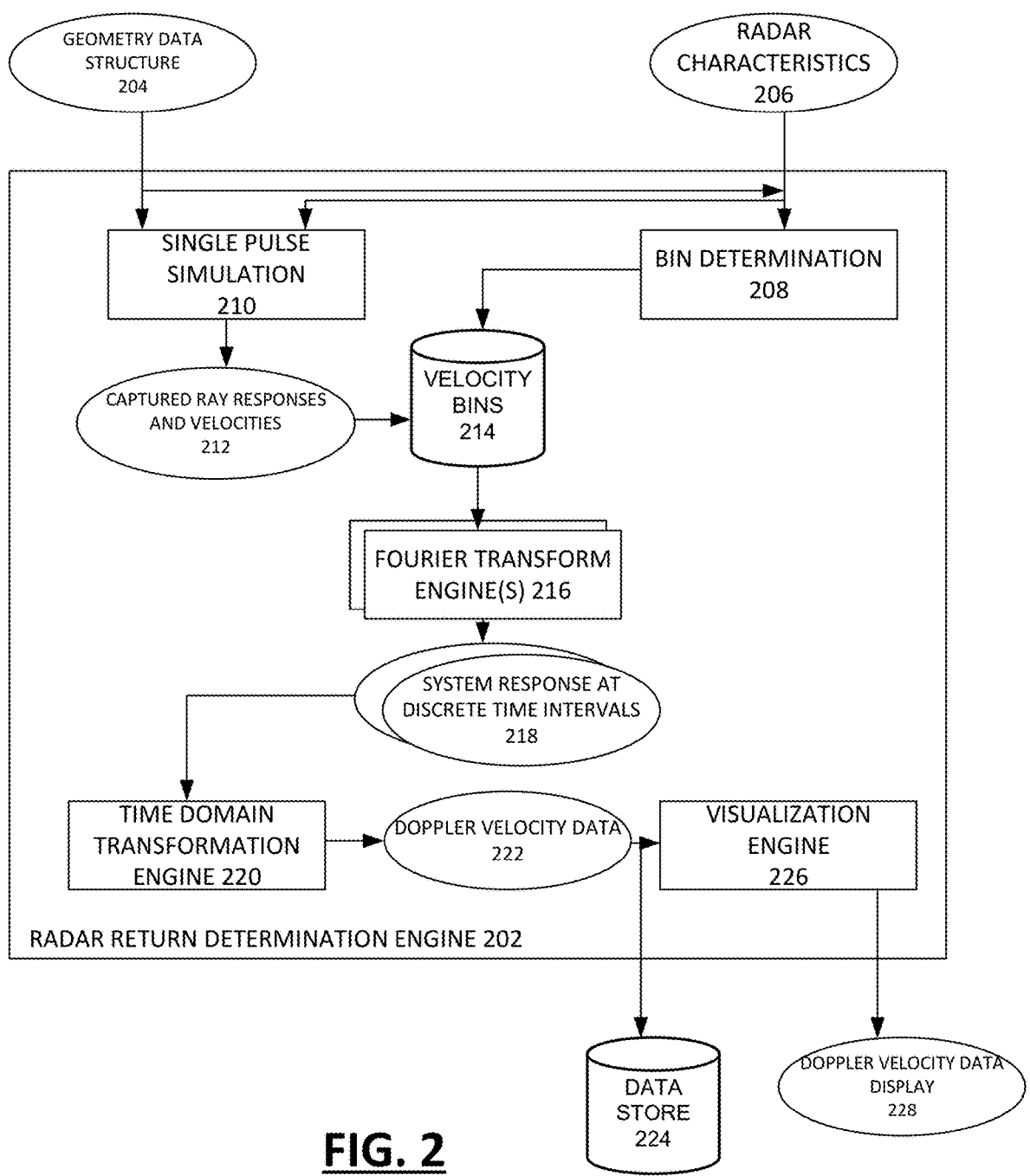
FIG. 2 is a block diagram depicting example operations of a radar return determination engine.

FIG. 2 is a block diagram depicting example operations of a radar return determination engine. The radar return determination engine 202 receives the geometry data structure 204 and the radar characteristics 206 of the radar to be simulated. The engine 202 uses the geometry data structure 204 and radar characteristics 206 to set up a series of bins at 208 into which individual ray returns will be assigned based on the corresponding return velocities of those ray returns. The geometry data structure 204 and the radar characteristics 206 are used by the engine 202 to execute a single pulse simulation (e.g., simulation of a pulse at the center of a CPI) at 210 to generate a set of ray responses and associated ray velocities 212 corresponding to rays transmitted from an antenna position whose response contributions are captured at a receiver position. Each of a plurality of ray returns are accumulated into one or more of the velocity bins 214 determined at 208. One or more Fourier transforms is performed at 216 using the binned data to obtain a system response at discrete time intervals 218. A time domain transformation engine 220 can be used to transform the system response at the discrete time intervals into Doppler velocity data 222. The Doppler velocity data is stored in a non-transitory computer-readable medium at 224, and a visualization engine 226 is used to generate a Doppler velocity data display 228.

In one example system, Accelerated Doppler Processing (ADP) provides ray-based extrapolation that can been used with a simulation system (e.g., HFSS-SBR+) to accelerate pulse-Doppler radar simulation but that is generally applicable to ray-based techniques. While its benefits are described and demonstrated herein for automotive pulse-Doppler radar, the systems and methods described herein are more broadly applicable to any scenario where one wishes to simulate electromagnetic (EM) responses (or acoustic responses) of a scattering geometry over a range of small variations in the geometric configuration (e.g., shifting the position and orientation of geometric parts and also the transmitting (Tx) and receiving (Rx) antennas). Systems and methods may only perform the simulation once on a base configuration of the scattering geometry. Then, using Fourier processing (FFTs) on velocity-binned output from the base ray-tracing simulation, systems and methods can quickly extrapolate the results to variations in the geometric configuration without further simulations.

In general, systems and methods described herein can provide benefits that can include: 1) massive acceleration and 2) reduced simulation artifacts. The acceleration benefit arises because the system is performing 1 simulation instead of N simulations for N geometric variations. Also, the post-processing required to obtain the extrapolated results is of minimal expense relative to the cost of the single simulation because it can be done with a small number of fast Fourier transforms (FFTs). The reduced artifact benefit arises because the N extrapolated results are obtained from the single ray set of the base simulation instead of N slightly different rays sets. If one were to compare any two of the N ray sets from the brute force approach, there would be a one-to-one correspondence for most of the ray tracks. The details of these corresponding ray tracks would differ in terms of ray hit points (because the geometry moved) and ray-track path lengths, but that is expected and not a problem. However, a small number of ray tracks would be left over that could not be reconciled between the two sets, with different surfaces being hit or different number of bounces in the tracks. These tracks would have very different contributions to the result. Depending on how the result sets are further processed, such as forming a range-Doppler image or a Doppler velocity plot, these artifacts can become quite prominent.

Systems and methods described herein can tie the geometric variations of the scattering geometry to a time variable (t). That is, the systems and methods assign scattering contributions of rays to accumulation bins according to the rate of change in their total path length (R) relative to time: dR/dt. When a ray hits a surface, the system folds the surface's velocity into the rate-of-change of the ray track's overall path length (dR/dt). When all moving parts along a single ray track are considered, including the possible motion of the Tx and Rx antennas, the system obtains a composite dR/dt for the entire ray track. When the system determines the scattering contribution of a ray track, the system uses dR/dt to identify the nearest velocity bin and accumulate that contribution in that bin. The velocity bins are uniformly spaced and encompass the entire range of possible values for dR/dt.

Systems and methods described herein can be used in other applications as well, such as extrapolating monostatic RCS over a range of aspect angles to produce an inverse synthetic aperture radar (ISAR) image. There, the independent variable (IV) of the target motion is a scalar angle ($\varphi$), not time, and the system accumulates ray contributions into bins according to the rate of change in the ray path length relative to aspect angle (dR/d$\varphi$). Post-processing to perform the extrapolation over aspect angles may be similar, but the interpretation is no longer one of velocity. On the other hand, if one measured the radar cross-section (RCS) of a rapidly rotating target with a pulse-Doppler radar over a short span of time (e.g., one CPI) corresponding to some aspect span of the target, the range-Doppler image it would generate would in fact be an ISAR image. Each radar pulse within the CPI would coincide with a different aspect angle of the target, and combining the radar's pulse repetition frequency (PRF) with the angular velocity of the target would provide the angular sampling density of the target. Likewise, the span of the pulse-Doppler CPI would correspond to the span of aspect angles. In this case, the ISAR cross-range domain would directly map to the Doppler velocity domain.

One implementation of systems and methods described herein can be described as follows:

Accumulate ray contributions in uniformly spaced velocity bins {$v_0$, $v_1$, ... $v_{M-1}$} according to the rate of change in ray path length (R) relative to the scalar independent variable (IV, say x) that determines the positions and orientations of parts. dR/dx may be determined efficiently during the simulation based on simple analytic geometry principles and information obtained from the model data structure whenever a ray hits a surface. dR/dx also incorporates the velocities of the Tx and Rx antennas because their motion affects total path length R.

Fourier transform the binned contributions to extrapolate the scattered field response to different values of x that are not too far from its value ($x_0$) in the base ray-tracing simulation. In general, if x is to be extrapolated from $x_{min}$ to $x_{max}$, it is best if the one simulation is performed for $x_0=(x_{min}+x_{max})/2$. That way, the system minimizes the extrapolation distance (measured in terms of x). To extrapolate in one direction relative to $x_0$, the system uses a forward Fourier transform. To extrapolate in the other direction relative to $x_0$, the system uses an inverse Fourier transform. There, (x–$x_0$) is negative rather than positive in the Fourier transform. To perform the extrapolation efficiently using FFTs (FFFTs and IFFTs), the sample points of x from $x_{min}$ to $x_{max}$ are uniformly spaced. Velocity bins in this example are also uniformly spaced. When it is not convenient in the particular application for the extrapolated sample points of x to be uniformly spaced, a substitute set of sample points that are uniformly spaced can instead be generated and used as the target domain of the FFTs, followed by interpolation of results from the substitute set of sample points to the originally intended sample points.

The binning process leads to quantization error, as each ray contribution never lands precisely in the middle of its nearest velocity bin, $v_i$. This quantization error can be managed to yield a clean extrapolation. In one embodiment, due to quantization error, only the lower 10-25% of the FFT (or IFFT) result will be used, meaning the portion of the transformed result closest to "DC" where x=$x_0$. The remaining 75-90% is too noisy and may be discarded in some implementations. The 10-25% threshold arises from numeric tests where FFT results are compared with true Fourier transforms that allow bin size to go to zero (i.e., no binning at all). Hence, the bin space (dR/dx) and the transform space (x) may be set up according to the usual constraints of FFTs such that the extrapolation range will reside in this 10-25% region where the effects of quantization error are minimized. In practice, this means the uniform bins may be oversampled relative to the resolution otherwise expected. For example, if a system is generating range-Doppler images with a Doppler velocity resolution of $\Delta v$, then the system may utilize a CPI of a certain time span. Oversampling the velocity bins by 4×-8× relative to Δv has shown to be effective. Quantization error can be further minimized by spreading each ray track contribution over a set of neighboring bins using a blending formula. For example, with linear blending, if a ray track contribution landed precisely at the border between two bins, the system would accumulate half the contribution in the left bin and half in the right bin.

Figure 3:
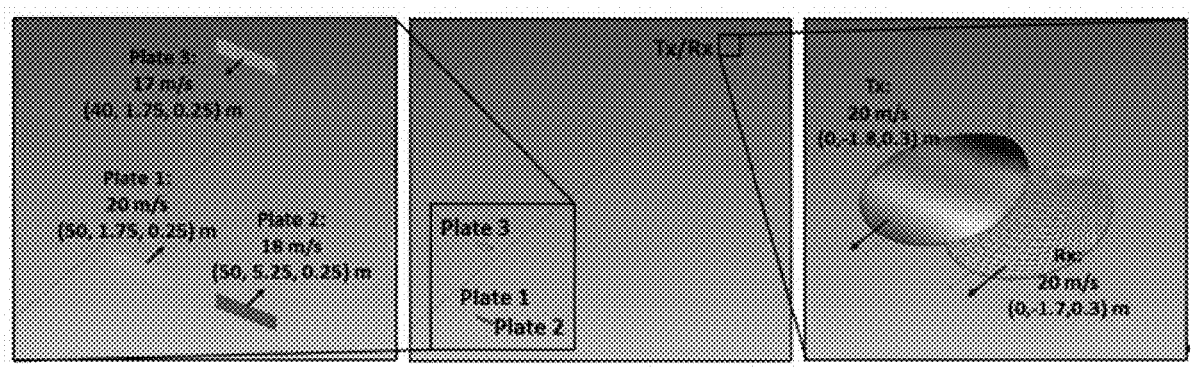
FIG. 3 depicts a moving pulse-waveform Doppler radar interrogating three moving plates.

A first example describes generating a display of radar returns of three rectangular plates using broad pulse Doppler radar. FIG. 3 depicts a moving pulse-Doppler radar interrogating three moving plates. The three plates are each 2 m×0.5 m metal plates. These plates are sized to represent in simplified form either the front grills of oncoming vehicles (Plates 1 and 2) or the vertical trunk surface of a vehicle (Plate 3) in the same lane as the vehicle having the radar system installed thereon, designated as the EGO vehicle. The EGO vehicle is traveling at 20 m/s in the +x direction, represented by its Tx and Rx beam antennas. There is no physical structure for the EGO vehicle, just the radar antennas that move with it.

Figure 4:
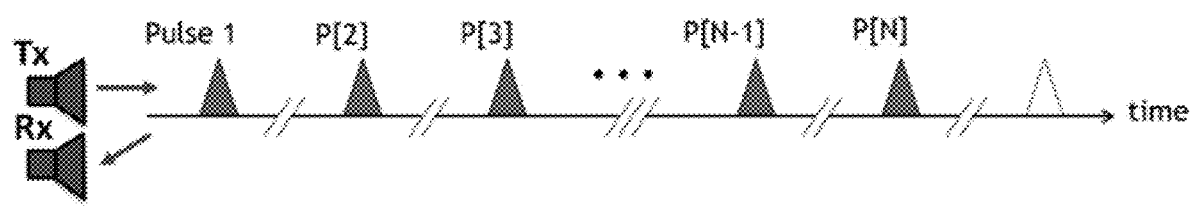
FIG. 4 depicts a pulse train issued by a pulse-waveform Doppler radar.

The system of FIG. 3 is used to first explain some basic principles of a pulse-Doppler radar. A pulse-Doppler radar issues a sequence of pulses from its Tx antenna at regular time intervals $\Delta t_p$. The pulses are depicted as triangles in FIGS. 4 and 5, and their actual shape depends on details of the radar design. After the start of each pulse, the radar waits $\Delta t_p$ while observing with its Rx antenna(s) whatever comes back from the scene. Because the real world is complex, the received signal is also complex, while extending over a longer time period than the transmitted pulse. Alternatively, one can think of the received signal as a whole series of clean pulses coming back from the scene at different times and amplitudes according to the distance to and intrinsic scattering strength of various spatially localized scattering features in the scene (comprising cars, road, pedestrians, infrastructure, buildings, trees, terrain, etc.). The issued pulse width $T_p$ (see FIG. 5) determines the spatial detail with which scattering features in the scene can be resolved. For example, if each pulse lasts $T_p$=5 ns, then each pulse extends over 1.5 m as it travels through space. Because of the round-trip effect from the Tx out into the scene and back to the co-located Rx (i.e., monostatic radar), this means the radar can resolve scene features to a resolution of $R_r$=0.75 m, or half the spatial pulse width. The 5-ns pulse width also means the radar has a bandwidth BW=1/$T_p$=200 MHz. In general, the range resolution is given by $$R_r = \frac{cT_p}{2} = \frac{c}{2BW}, \quad (1)$$

where c is the speed of light.

Figure 5:
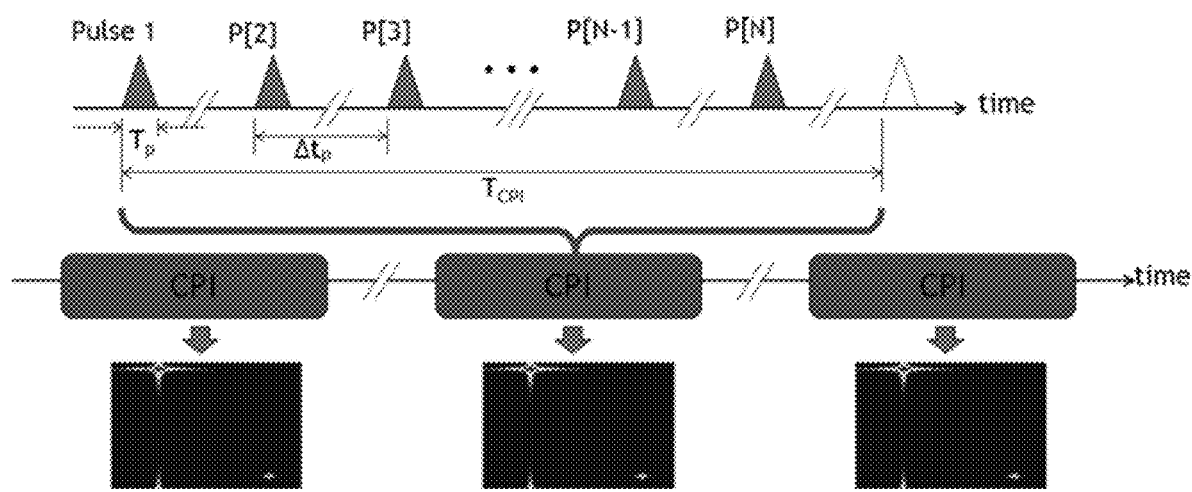
FIG. 5 depicts pulses of a CPI and displays of radar returns associated with a CPI.

In order to obtain Doppler velocity information, the pulses are repeated with a time interval $\Delta t_p$. With a pulse-Doppler waveform, this interval is much larger relative to the pulse width $T_p$ than implied by FIGS. 4 and 5. For example, a system might have $\Delta t_p$=20 μs, 4000 times larger than the 5-ns pulse width assumed earlier. To develop a Doppler response, the pulses are repeated (and observed by the Rx antenna(s)) $N_p$ times, which may measure in the hundreds. These $N_p$ issued pulses and measured responses are called a coherent processing interval (CPI), as shown in FIG. 5, meaning they are processed by the radar as a block (or frame). CPI also refers to the duration of that interval:

CPI=$N_p \Delta t_p$. For example if $N_p$=200, $\Delta t_p$=20 μs, then CPI=4 ms. The Doppler information is obtained by comparing the responses from pulses within a CPI for accumulating phase differences.

For example, suppose a scenario has a highway engagement where an approaching car is traveling 60 m/s relative to the radar car (EGO vehicle), or 134 mph. Between two pulse intervals ($\Delta t_p$=20 μs), the approaching car will travel 1.2 mm closer to the EGO vehicle. One can assume that few things in the scene will be approaching or receding from the EGO vehicle much faster than this. Thus, the measured time response between pulses will hardly change at all because nothing significant will have moved more than 1.2 mm. However, if the radar operates at 77 GHz, where the wavelength is λ=3.89 mm, the phase response of the approaching car will have advance 0.616λ or 222°, which is quite measureable with a coherent radar processing system. This figure is obtained by comparing the change in the round-trip path length (Tx antenna to the approaching car and back to the Rx antenna) with the wavelength, λ.

If a scenario has two different cars traveling at different velocities relative to the EGO vehicle, their phase differences will accumulate with each succeeding pulse in proportion to the differences in their velocities. Here, the velocity that counts is the component perpendicular to the radar, as components parallel to the radar result in no phase shift between pulses. The velocity resolution of the radar, its ability to distinguish two closely-spaced velocities, is inversely related to the duration of the CPI. To resolve the two cars, or more generally, two scattering features in the scene, their initial phase difference at the first pulse must deviate by at least 360° (one wavelength) by the end of the CPI in order to be reliably resolved. From this, and remembering to include the round-trip effect, one can determine that the velocity resolution $R_v$ is given by $$R_v = \frac{c}{2f_c CPI}, \quad (2)$$

where $f_c$ is the center frequency of the radar. In the preceding example, since $f_c$=77 GHz, $\Delta t_p$=20 μs, and $N_p$=200 (implying CPI=4 ms), the velocity resolution is therefore $R_v$=0.49 m/s.

Thus far, nothing has directly constrained the inter-pulse interval $\Delta t_p$, as it plays no role in range resolution and no exclusive role in velocity resolution. In the above example, one could grow or shrink $\Delta t_p$ while simultaneously shrinking or growing $N_p$ while maintaining the same CPI and velocity resolution. Instead, two conflicting constraints upon $\Delta t_p$ come from separately disambiguating range and velocity measurements.

When the radar Rx observes the pulse backscattered from the scene, it has no way to reliably distinguish whether this came from the current pulse or some preceding pulse issued some multiple of $\Delta t_p$ intervals earlier; there is an inherent range ambiguity. While activity from each pulse eventually dies down as the pulse spreads out, this effect cannot be completely depended upon, especially in regard to the immediately preceding pulse. Continuing the previous example, the scattered field from an object located 3000 m (½ $\Delta t_p$=10 μs at the speed of light) away from the EGO vehicle will arrive at the Rx antenna after $\Delta t_p$=20 μs, precisely when the next pulse is being issued. Thus, the range ambiguity (period) $P_r$ is given by $$P_r = \frac{c\Delta t_p}{2} = \frac{c}{2PRF}. \quad (3)$$

The new quantity introduced in Eq. (3), pulse repetition frequency (PRF), is just the reciprocal of $\Delta t_p$. PRF is a more commonly used metric for pulse-Doppler radars than inter-pulse interval. In this case, PRF=50 kHz, yielding a range ambiguity of $P_r$=3 km.

It was noted above that an object approaching the EGO vehicle at 60 m/s would introduce a phase shift of 222° between pulses separated by $\Delta t_p$=20 μs of its 77 GHz radar. From this one can infer that a vehicle approaching at 97.3 m/s would introduce a phase shift of 360° between pulses, which would therefore be indistinguishable from an object approaching at 0 m/s, and likewise indistinguishable from one receding at 97.3 m/s. That is, the velocity ambiguity is $P_v$=97.3 m/s=218 mph. Because cars traveling at 90 mph are not that unusual on interstates, which means an approaching velocity of up to 180 mph relative to the EGO vehicle if it too is traveling at 90 mph, one might designate perceived velocities above 180 mph to be mapped as receding velocities, where 181 mph becomes 181−218=−37 mph. One can see then that a velocity ambiguity of 97.3 m/s might not be quite enough margin and that one should decrease $\Delta t_p$ (increase PRF in the pulse-Doppler radar design). More generally, one can write, $$P_v = \frac{c}{2f_c \Delta t_p} = \frac{cPRF}{2f_c}. \quad (4)$$

Comparing Equations (3) and (4), one can see it may be desirable to maximize range and velocity ambiguity by adjusting $\Delta t_p$ (PRF) in opposite directions. To increase range ambiguity, one could decrease PRF and thus sacrifice velocity ambiguity and vice versa. Any pulse-Doppler radar, or any other radar modulation and waveform scheme intended to deliver both range and Doppler velocity, may make this fundamental compromise between range and velocity ambiguity based on the needs of the application.

With this background on pulse-Doppler radar, this description proceeds with the initial example (Example 1) involving three metal plates. The description first focuses on Doppler processing; range processing will be added in later examples. A system sets the center frequency of the radar to $f_c$=76.5 GHz and the inter-pulse interval to $\Delta t_p$=18.6796 μs (PRF=53.5344 kHz). It is assumed the pulse is very broad (has large $T_p$), almost half the $\Delta t_p$ interval. This means the radar is extremely narrow band (BW~=110 kHz) and a system can therefore accurately simulate it as a continuous wave (CW) radar operating at a single frequency: $f_c$=76.5 GHz. That is, the response of each pulse is well approximated by running a frequency-domain simulation system at a single frequency. The Tx and Rx antennas are vertically polarized beams of $\cos^n(\theta)$ form, with half-power beamwidths of 60° and 15° vertical and horizontal, respectively (see FIG. 3). With an assumed perfect match, this gives the antennas a peak gain of 16.2 dBi. The precise positions and velocities of each element at time t=0 are summarized in Table 1. The plate positions correspond to the plate center (each plate measures 2 m×0.5 m). The Doppler Speed is the radial component of the velocity of the object relative to the moving center point between the Tx and Rx antennas.

TABLE 1

| Object positions and velocities at t = 0 | | | |
|---|---|---|---|
| Scene Object | Position (t = 0) [m] | Ground Velocity [m/s] | Doppler Speed [m/s] |
| Tx | (0,−1.8,0.3) | (20,0,0) | 0 |
| Rx | (0,−1.7,0.3) | (20,0,0) | 0 |
| Plate 1 | (50,1.75,0.25) | (−20,0,0) | 39.9 |
| Plate 2 | (50,5.25,0.25) | (−18,0,0) | 37.6 |
| Plate 3 | (40,−1.75,0.25) | (17,0,0) | 3.0 |

A system sets the number of CPI pulses to $N_p$=210. From this, $\Delta t_p$, and Equations (2) and (4), the system obtains CPI=$N_p \Delta t_p$=3.9227 ms, velocity resolution $R_v$=0.4995 m/s and velocity ambiguity (period) $P_v$=104.8967 m/s. Note that $P_v = N_p R_v$, the usual relationship implicit in FFTs among the aliasing ambiguity (period), resolution, and sample count quantities.

To simulate one CPI, a system can use batch processing to perform 210 simulations, advancing objects according to their velocities and $\Delta t_p$. For example, with each pulse, Tx and Rx advance together by 0.3736 mm along the +x axis, while Plate 2 advances 0.3362 mm in the opposite direction. Also, for later convenience when the system compares these direct (brute force) results with ADP, the system shifts the CPI to be centered at t=0. More precisely, the first pulse (Pulse 1) occurs at t=−$N_p$/2 $\Delta t_p$=1.9614 ms, Pulse 106 occurs at t=0, and last pulse (Pulse 210) occurs at t=($N_p$/2−1) $\Delta t_p$=1.9427 ms. Note that the CPI is therefore not precisely centered but, instead is shifted back in time by an additional $\Delta t_p$/2. This is done to preserve a t=0 sample with an even number of pulses. Because the system will be performing Fourier processing of the simulation results using FFTs, this follows a common convention that when the number of time samples is even and t=0 is to be placed notionally in the middle of the samples, it is instead placed in the first cell of the second half of the samples. This is merely a convenience that allows a system to easily move the t=0 sample between the first cell position and the "middle" cell position using standardized operations. When the time comes to accelerate the same simulation using ADP, centering the CPI about a local t=0 may improve its accuracy because it halves the spatial distance over which ray path lengths will be extrapolated.

Figure 6:
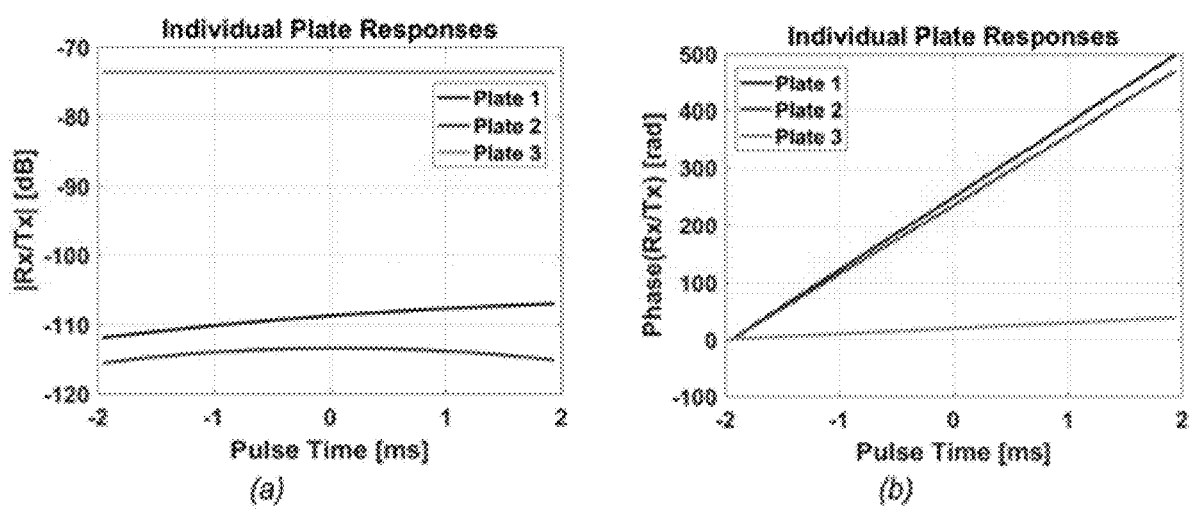
FIG. 6 depicts separate responses of each plate over one CPI.

This description looks first at the individual responses of each plate. FIG. 6 shows the magnitude and unwrapped phase response of each plate as measured by the Rx antenna across the 210 pulses of the CPI. For magnitude, the vertical scale is the Tx to Rx coupling ratio in dB, with the direct coupling between Tx and Rx deliberately ignored in the simulation; all coupling is via backscattering of fields from the plates.

Figure 7:
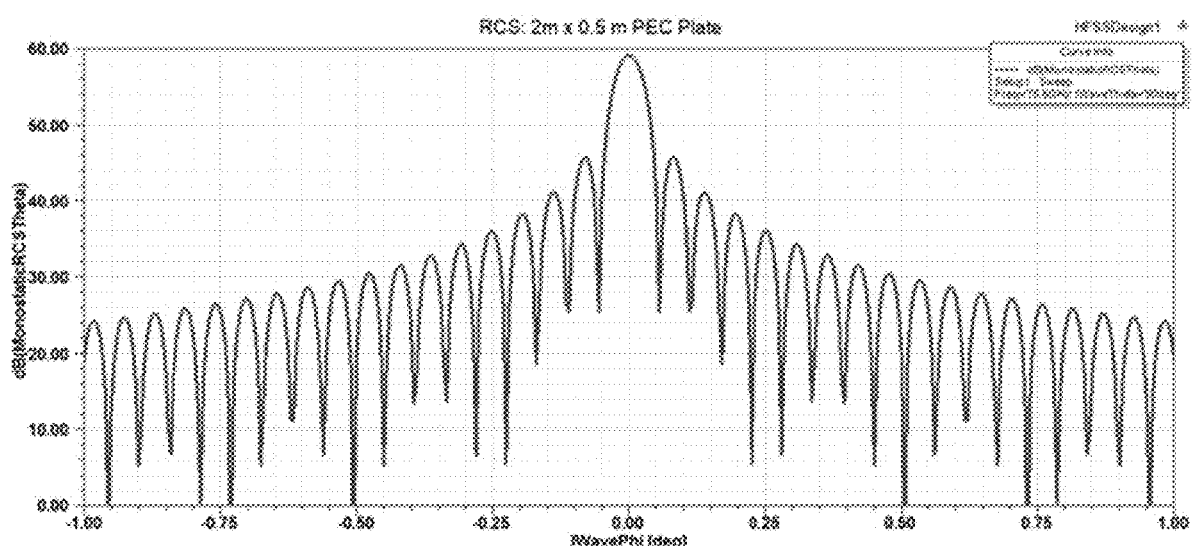
FIG. 7 depicts an RCS of a metal plate.

Perhaps unexpectedly given their identical sizes and the fact that they are all nearly broadside to the Tx and Rx antenna beams, the magnitudes of the 3 plate responses vary from each other by as much as 40 dB. At 40 m separation from the EGO vehicle, one might expect Plate 3 to only be 3.8 dB stronger than either Plates 1 or 2 located at 50 m, not 40 dB stronger. However, at 76.5 GHz, these 2-m wide plates extend over 500 wavelengths. Hence, small changes in incident angle can lead to large changes in observed radar cross-section (RCS). FIG. 7 shows the RCS of a 2 m×0.5 m plate at 76.5 GHz in the horizontal cut as predicted by the physical optics technique.

One can see that the broadside peak is only 0.1° wide, so a deviation of more than 0.05° traverses into the RCS side lobes, which start at 13.5 dB down from the broadside peak and progressively weaken at wider angles. Here, the radar is only perfectly broadside to Plate 3. The horizontal angle measured from the perpendicular of Plate 1 to the center of the Tx/Rx pair is 4°, which is well off the RCS plot in FIG. 7 and so at least 30 dB down from the peak RCS. The much weaker responses of Plates 1 and 2 can now be quantitatively explained.

FIG. 7 also explains the curved trend of the Plate 2 across the CPI. From start to finish, Plate 2 moves 70.3 mm from x=50.0353 m to 49.9650 m. Likewise, the Tx/Rx pair move 78.1 mm from x=−0.0392 m to +0.0389 m. Because the Tx/Rx pair is laterally offset from the center of Plate 2 by 7.0 m, this means the angle measured from the Plate 2 perpendicular to the Tx/Rx pair changes by 0.023° from 7.958° to 7.981°. From FIG. 7, one can see the side lobes have a null-to-null width of about 0.06°, so an angular movement of a little more than one third of this is definitely sufficient to produce the slow rise and fall in the observed backscattered signal from Plate 2.

With reference to the unwrapped phase response in FIG. 6b, the behavior also makes sense. As documented in Table 1, the EGO vehicle is approaching all three plates and their respective returns thus have positive velocity measured along the radial direction. Plate 1 is the fastest at 39.9 m/s and thus has the steepest slope, while Plate 3 is the slowest at 3.0 m/s and thus has the shallowest slope. Over the course of one CPI, Plate 1 moves 0.1565 m closer to the Tx/Rx pair. Because the wavelength is λ=3.919 mm, this corresponds to a 79.9λ change in round-trip path length, or 502 radians, precisely as shown in FIG. 6b.

Figure 8:
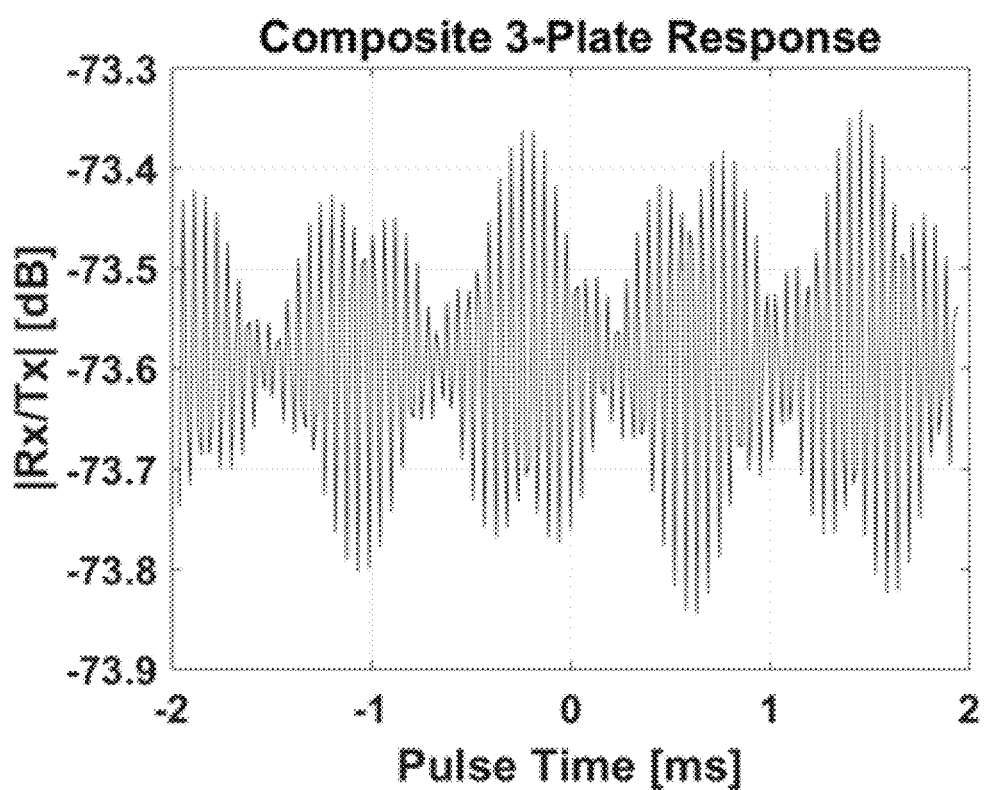
FIG. 8 depicts a CW response of three plates over one CPI.

The composite response when the 3 plates are interrogated together is shown in FIG. 8. The rapid oscillations are caused by the interplay of responses from rapidly moving Plates 1 and 2 with slower moving Plate 3 (relative to EGO vehicle). The slower ringing observed in the envelope of the rapid peaks and troughs is caused by the interplay of Plates 1 and 2 because their relative velocities only differ by 2 m/s.

Figure 9:
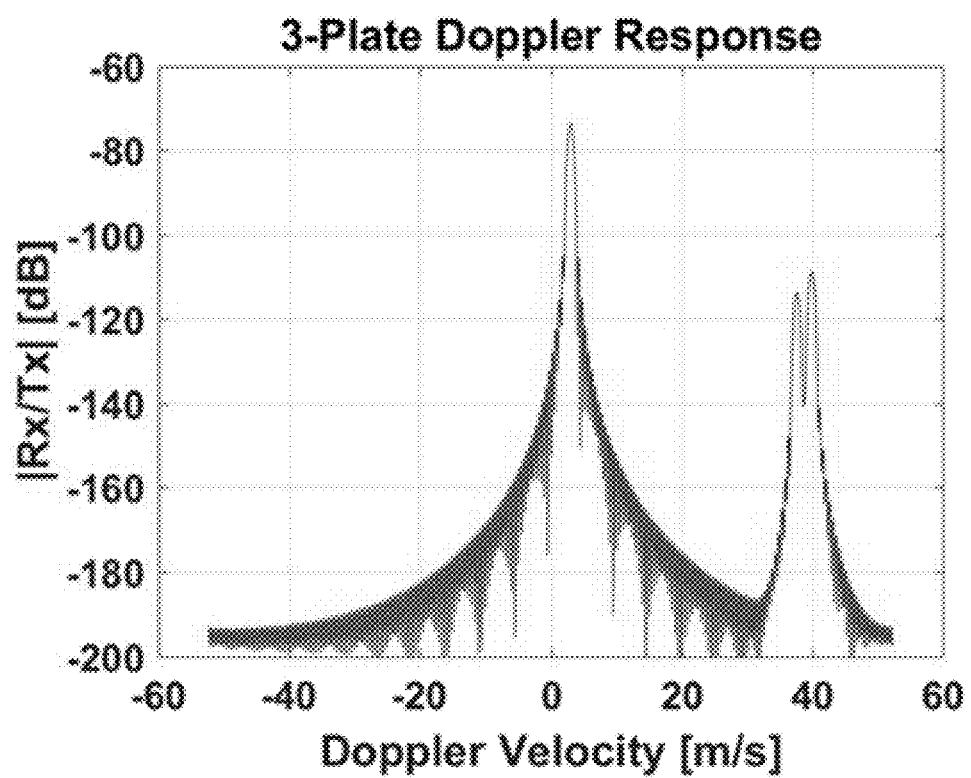
FIG. 9 depicts a Doppler velocity response of three plates over one CPI.
Figure 10:
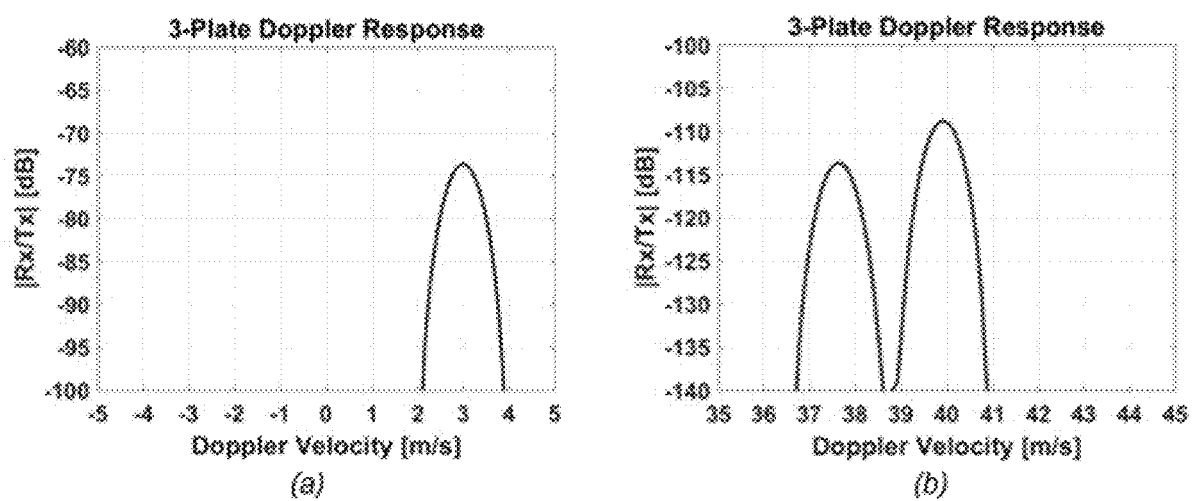
FIG. 10 depicts a zoomed in Doppler velocity response for plate 3 and plates 1 and 2.

The Doppler velocity (frequency shift) response is obtained by forward Fourier transforming the time response. The result is shown in FIG. 9. The Doppler speeds anticipated in Table 1 based on geometric considerations are faithfully recovered, as are the associated levels of these responses observed in FIG. 6a when the plates were simulated individually. FIGS. 8 and 9 are just two different ways of looking at the same data, but the Doppler velocity profile is much easier to correlate with features in the scene. This is the power of Doppler radar systems. FIG. 10 zooms in on the three main Doppler response features to help confirm their correlation with Table 1 and FIG. 6a.

Figure 11:
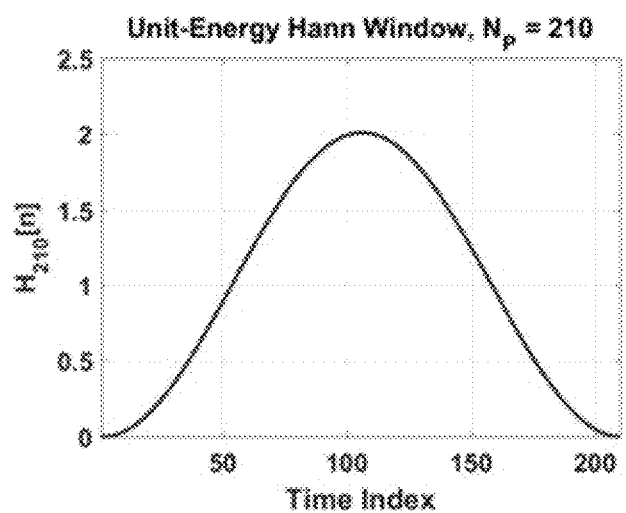
FIG. 11 depicts a unit-energy Hann signal-processing window.
Figure 12:
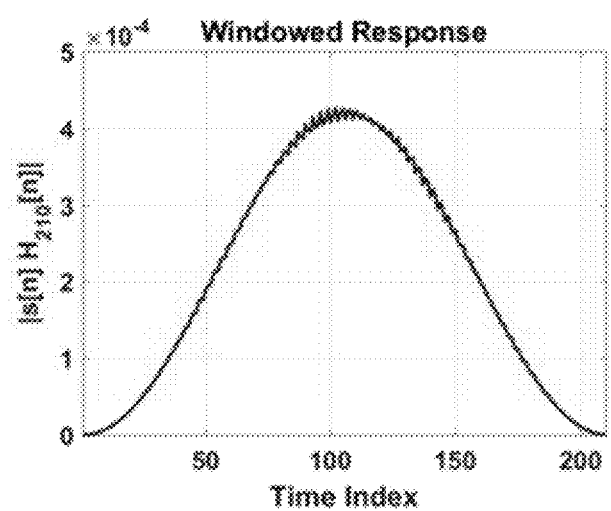
FIG. 12 depicts a windowed time response.
Figure 13:
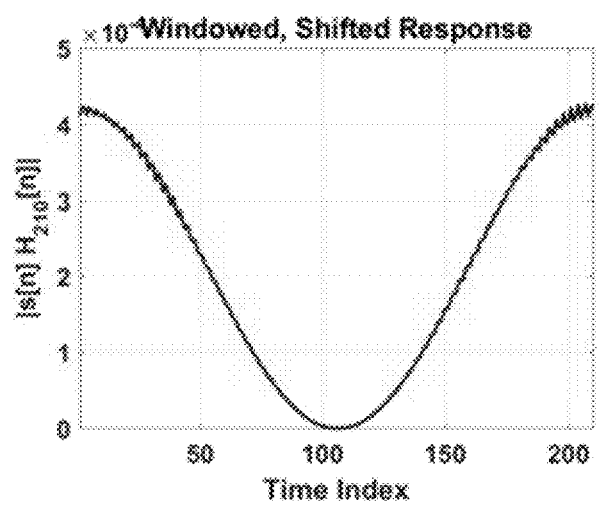
FIG. 13 illustrates a windowed, shifted time response.
Figure 14:
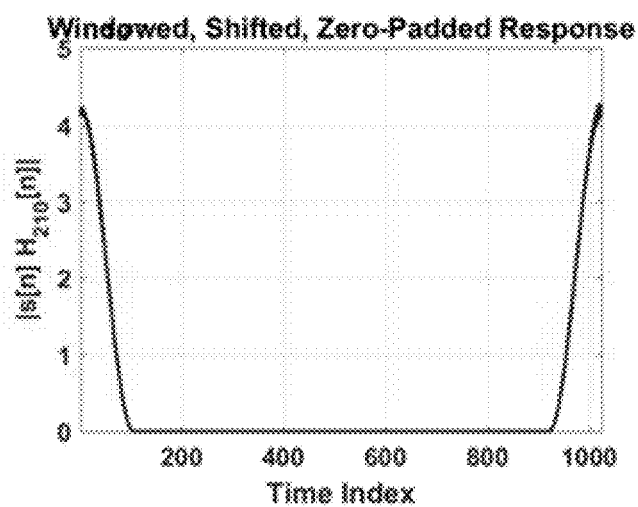
FIG. 14 depicts a windowed, shifted, zero-padded time response.

The detailed steps by which the Doppler responses in FIGS. 9 and 10 were obtained follow: Start from the time response over one CPI (see FIG. 8). Generate a unit-energy Hann (raised cosine) signal-processing window of size $N_p$=210 as shown in FIG. 11, centered on the t=0 sample (index 106, where sample indices are numbered starting from 1). "Unit-energy" means the window samples are scaled such that their sum is $N_p$, which ensures application of the Hann window will not bias the response strength up or down. Apply the Hann window to the time response via point-for-point multiplication as shown in FIG. 12. This will reduce signal-processing side lobes in the Doppler velocity response. For a general post-processing capability, other window functions may be employed (e.g., Taylor, Chebyshev, and Kaiser, etc.). Swap the left and right halves of the samples so the t=0 sample moves from Index 106 to Index 1 as shown in FIG. 13. Likewise the first negative time sample at t=−$\Delta t_p$ will move from Index 105 to Index 210. The t>=0 samples will reside over index range [1,105] while the t<0 samples will reside over [106,210]. This sets the stage for applying an FFT where the t=0 sample is expected to be the first sample. Zero-pad the time samples out to the first power 2 where $N_{FFT}$=$2^m$>=4 $N_p$ as shown in FIG. 14. In this case, $N_{FFT}$=1024. This yields at least 4× oversampling in the Doppler velocity domain and a smoother response curve. Without oversampling, the Doppler response looks too choppy, even though it would contain all the information content. In embodiments, it is beneficial for the 1024−210=814 zero-padding null samples be inserted between the t>=0 samples and the t<0 samples. At this point, the t>=0, zero-padding, and t<0 samples will reside in the ranges [1,105], [106,919], and [920,1024], respectively. Then forward FFT the windowed, shifted, and zero-padded time response using a standard FFT algorithm that implements, $$X_k \sum_{n=1}^{N} x_n e^{-j2\pi(k-1)(n-1)/N}, 1 <= k <= N.$$

Figure 15:
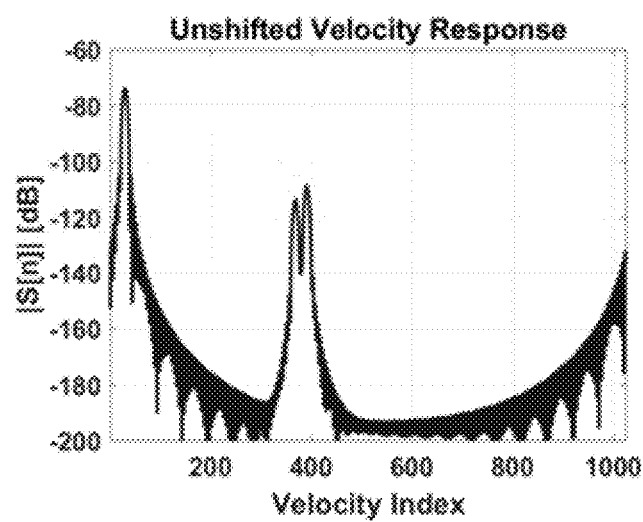
FIG. 15 illustrates an unshifted Doppler velocity response.
Figure 16:
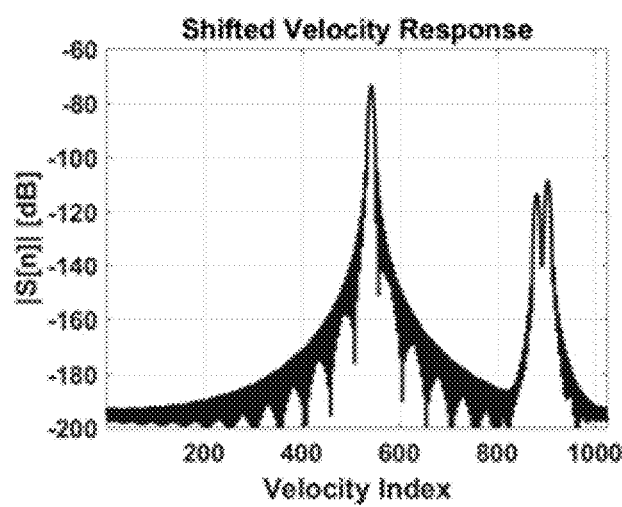
FIG. 16 illustrates a shifted Doppler velocity response.

It may be helpful to scale $X_k$ by 1/$N_p$ to maintain the same vertical scale as the time response. This will yield the Doppler velocity response with velocity v=0 in the first cell position as depicted in FIG. 15. Then swap the left and right halves of the Doppler velocity response as shown in FIG. 16 so that velocity v=0 is the first sample is the second half. In this case, v<0 and v>=0 samples will reside over index ranges [1,512] and [513,1024], respectively. The spacing Δv of the resulting velocity domain is $R_v N_p/N_{FFT}$, which again means that it is oversampled because $N_p/N_{FFT}$<1. Use Δv to construct a corresponding velocity domain against which to plot the Doppler response (see FIG. 9). In this case, because $R_v$=0.4995 m/s, $N_p$=210, and $N_{FFT}$=1024, the system obtains Δv=0.1024 m/s. The 1024 velocity domain samples are {−512Δv, −511Δv, . . . , 511Δv}, resulting in one period in the periodic, oversampled velocity domain.

Figure 17:
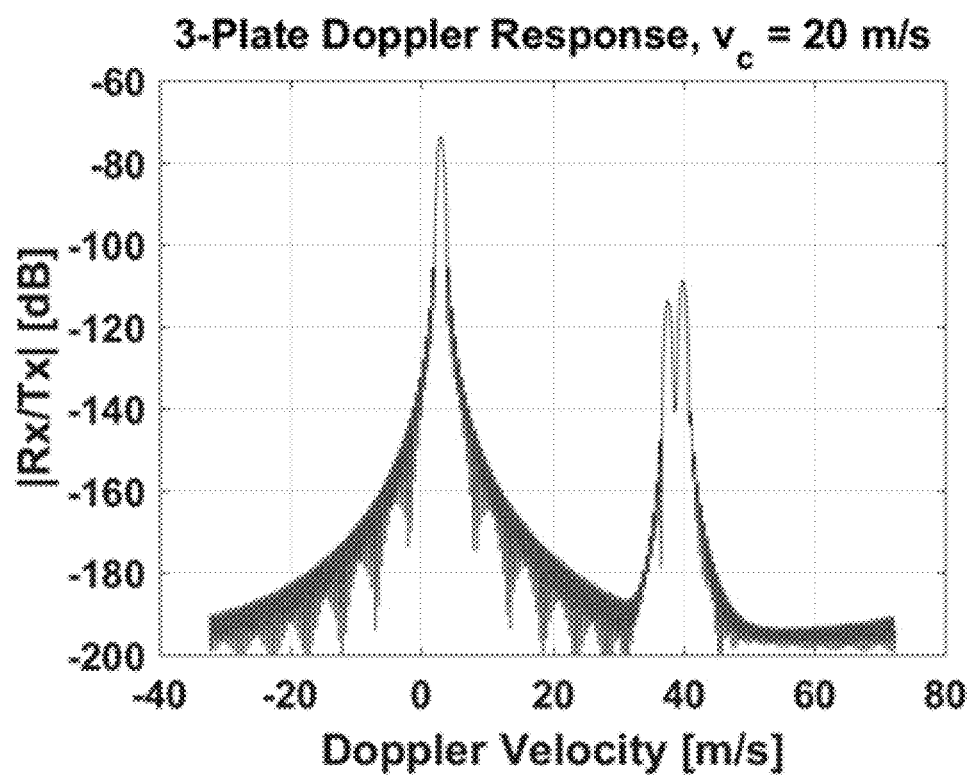
FIG. 17 depicts a Doppler velocity response of 3 plates over one CPI.

Because the velocity domain is periodic, the choice of its start or center velocity is arbitrary. The only constraint is that it extend over one period, $P_v$. In FIG. 9, v=0 was chosen at the center ($v_c$=0). However, because the EGO vehicle will not be traveling backward at highway speeds, this reality tends to favor expanding the range of approaching velocities (v>0) at the expense of receding velocities to make best use of the available velocity ambiguity. In FIG. 17, the center velocity is shifted from $v_c$=0 to $v_c$=20 m/s. Shifting the center velocity requires a small change in the processing steps starting from the time response. Specifically, before applying the window function, zero-padding, etc., apply a progressive phase shift to the time response: multiply each time-response sample by exp(−j2π$nv_c/P_v$), where n is the pulse (time) index that extends over the range [−$N_p$/2, $N_p$/2−1] if $N_p$ is even or [−($N_p$−1)/2, ($N_p$−1)/2] if $N_p$ is odd. Then add $v_c$ to the velocity domain sample points.

In one example, the 210 simulations for the 3-plate example required 4 min and 17 second on a modern laptop computer with 4 physical CPU cores and configuring the use of 7 threads in a multi-threaded implementation. Each was performed at a ray density of 0.2 rays-per-wavelength, resulting in 7,554 rays per radar pulse. Using ADP, nearly identical results can be achieved from a single simulation at the same ray density and only requires 3 seconds on the same computer hardware and multi-threading configuration.

That simulation can be further accelerated using further scaled processing core arrangements, such as using a graphics processing unit having 256 or more cores, such that the simulation can be performed in real time relative to a physical radar system.

In a simulation, each ray bounce paints an equivalent current that is radiated to the Rx antenna and coherently contributes to the composite Rx signal. To perform ADP, systems and methods use a modified simulation engine that distributes each ray contribution to the Rx signal into an array of velocity bins according to the rate of change of the total ray path length from Tx to Rx, dR/dt. To achieve accurate results and reduce the quantization error inherent in binning, the velocity bins can be oversampled by at least a factor of 4 relative to the velocity resolution $R_v$ of the Doppler radar system being simulated. It may also be desirable that the number of velocity bins, $N_{vb}$, be a power of 2 to maximize the efficiency of downstream FFT post-processing.

In this example, $N_p=210$ and $P_v=104.8967$ m/s, so the simulation is configured to use a velocity bin domain with $N_{vb}=1024$ bins and period $P_{vb}=2P_v=209.7935$ m/s. The factor of 2 in $2P_v$ is included such that the simulation operates in terms of total path length from the Tx antenna to the Rx antenna. Recall that $R_v$ and $P_v$ are for monostatic configurations and therefore have a factor of 2 removed from the round-trip path length so that the Doppler velocities can be related to physical velocities of moving objects. The ADP simulation does not attempt to recognize a monostatic or near-monostatic configuration, so it does not divide dR/dt by 2. Rather, that can occur in downstream post-processing of the velocity-binned results that is particularized to a monostatic configuration. Hence, the size of each velocity bin for this setup is $\Delta v=P_{vb}/N_{vb}=0.2049$ m/s, which is oversampled relative to $2R_v=0.9990$ m/s by a factor of 1024/210=4.88.

The ADP simulation maps contributions into the velocity bins so that approaching scatterers have positive velocity. For an approaching scatterer, dR/dt<0, so the ADP simulation maps contributions into the velocity bins according to −dR/dt, not +dR/dt. The ADP simulation sets the v=0 bin to be centered in the domain, or at the center of the first bin in the second half of $N_{vb}$ bins if $N_{vb}$ is even. The table below shows the precise extents of several velocity bins for this example.

TABLE 2

Velocity bins for Example 1 with nominal 4x Oversampling

| Bin # | Lower Extent [m/s] | Center [m/s] | Upper Extent [m/s] | Note |
|---|---|---|---|---|
| 1 | −1025Δv/2 = −104.9992 | −512Δv = −104.8967 | −1023Δv/2 = −104.7943 | First Bin |
| 512 | −3Δv/2 = −0.3073 | −Δv = −0.2049 | −Δv/2 = −0.1024 | |
| 513 | −Δv/2 = −0.1024 | 0 | Δv/2 = 0.1024 | v = 0 Bin |
| 1024 | 1021Δv/2 = 104.5894 | 511Δv = 104.6919 | 102Δv/2 = 104.7943 | Last Bin |

Figure 18:
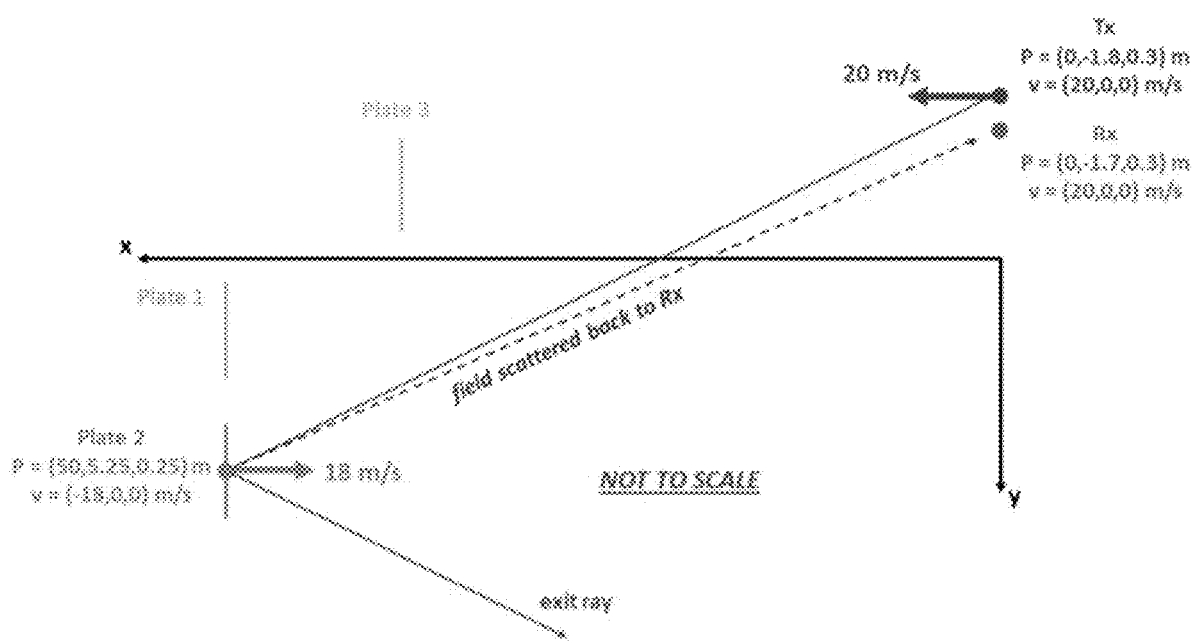
FIG. 18 depicts a single-bounce ray track.

The ADP simulation requires velocities to be assigned as input to the objects and antennas in the scene. dR/dt is computed on the fly for each ray track according to the encoded velocities of the ray source (Tx), objects at ray hit points, and the scattered field observer (Rx). To understand how the ADP simulation rolls up dR/dt for a particular scattering contribution to the Rx signal, the following considers one of the single-bounce ray tracks, as illustrated in FIG. 18 (the diagram is not to scale).

A ray is launched from the Tx antenna, hits the precise center of Plate 2, and then escapes. Surface currents painted by the ray at the hit point are radiated back to the Rx antenna, creating a scattered-field contribution to the Rx signal. The total path length, R, is therefore the distance from the Tx launch point to the hit point ($R_{hp,Tx}=50.4946$ m) plus the distance from the hit point to the Rx observer ($R_{Rx,hp}=50.4807$ m): R=100.9753 m.

For the first leg from the Tx antenna to the Plate 2 hit point, there are two contributions to dR/dt: the velocity of the launch point (Tx) and the velocity of the hit point. These are computed by taking the vector inner-product of the velocity vectors with the unit vector of the ray path. The unit vector from Tx to the hit point can be designated as $\hat{u}_{10}$: $\hat{u}_{10}=(0.9902,0.1396,-0.0010)$. The dR/dt component of the Tx antenna is then given by the vector inner-product, $<v_{Tx}, -\hat{u}_{10}>=-19.8041$ m/s. Likewise, the dR/dt component for the Plate 2 hit point for this first leg is given by $<v_{hp}, -\hat{u}_{01}>=<v_{hp}, \hat{u}_{01}>=-17.8237$ m/s. For the first leg, we therefore have $dR/dt=<(v_{hp}-v_{Tx}),\hat{u}_{10}>=-37.6278$ m/s. For the second leg from the hit point to the Rx antenna, the system can use a similar approach, this time using the unit vector $\hat{u}_{21}$ from the hit point to the Rx antenna: $\hat{u}_{21}=(-0.9905, -0.1377, 0.0010)$. For this second leg, $dR/dt=<(v_{Rx}-v_{hp}), \hat{u}_{21}>=-37.6381$ m/s. Combining velocity contributions from both legs, a composite dR/dt=−75.2659 m/s. If there are additional bounces before the ray escapes, the ADP simulation chains the same formula at each bounce, accumulating the components to dR/dt. In some embodiments, this method of determining dR/dt assumes ray hit points remain fixed relative to the moving surfaces that they hit, meaning that they move with the same vector velocity as these surfaces. However, in some situations, result accuracy may be improved by changing this assumption for one or more hit points along a multi-bounce ray track. This alternative approach for determining dR/dt is described later in the context of Example 5.

The ADP simulation then selects the velocity bin for depositing the Rx signal contribution according to −dR/dt. If the velocity bins are numbered starting from 1, as in Table 1, the bin index for −dR/dt=75.2659 m/s is given by 513−dR/dt/Δv=880.3722. Rounding, the system finds the nearest velocity bin is Bin #880 whose center velocity is 75.1896 m/s. The bin quantization error for this contribution is therefore |75.2659−75.1895| m/s=0.3722 Δv=0.0762 m/s. To reduce the effects of bin quantization error, the ADP simulation linearly blends the contributions into the two nearest bins. Because the unrounded bin index is 880.3722, 62.78% of the Rx signal contribution is accumulated in Bin #880 and 37.22% in Bin #881.

Figure 19:
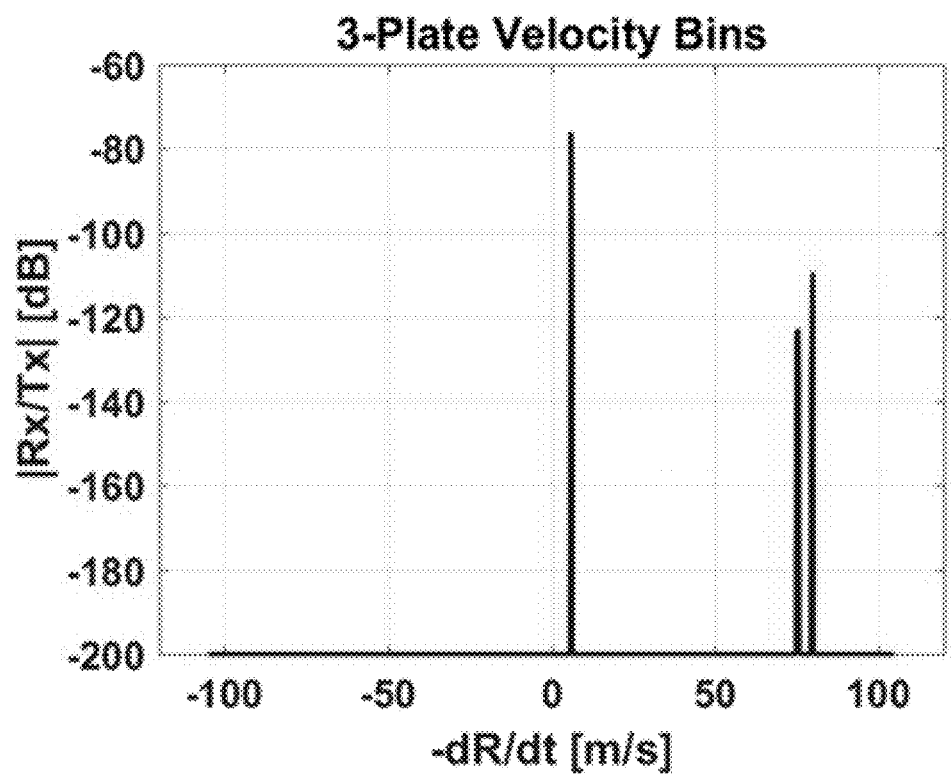
FIG. 19 illustrates velocity bin output for the 3-plate configuration.
Figure 20:
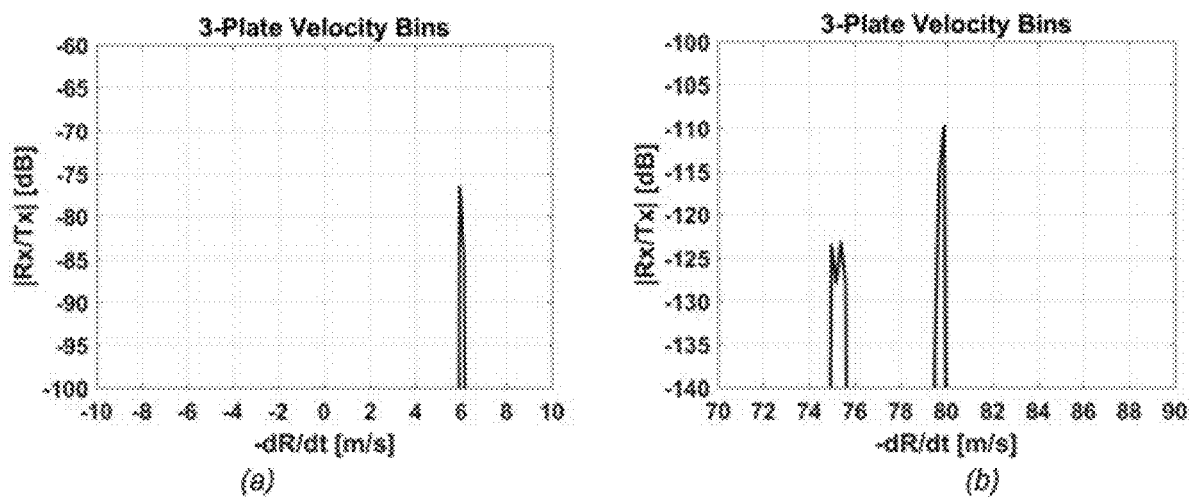
FIG. 20 depicts zoomed velocity bin output for plate 3 and plates 1 and 2.

With this background, one can understand the raw velocity-bin output of the ADP simulation for the 3-plate configuration, which is shown in FIGS. 19 and 20. It is worthwhile to compare these with the Doppler response in FIGS. 9 and 10 obtained via direct simulation of the 210 pulses across the CPI. The measurable Doppler response in FIGS. 9 and 10 is essentially a low-pass filtered version of the instantaneous velocity-bin response in FIGS. 19 and 20 (which is not physically measurable). In regular simulation, a large quantity of geometric ray information is generated, used, and then discarded before recording the final output, which is the coupled signal from the Tx to the Rx antenna. With ADP simulation, systems preserve some of this information and then exploit it to avoid having to simulate each pulse in the CPI.

Figure 21:
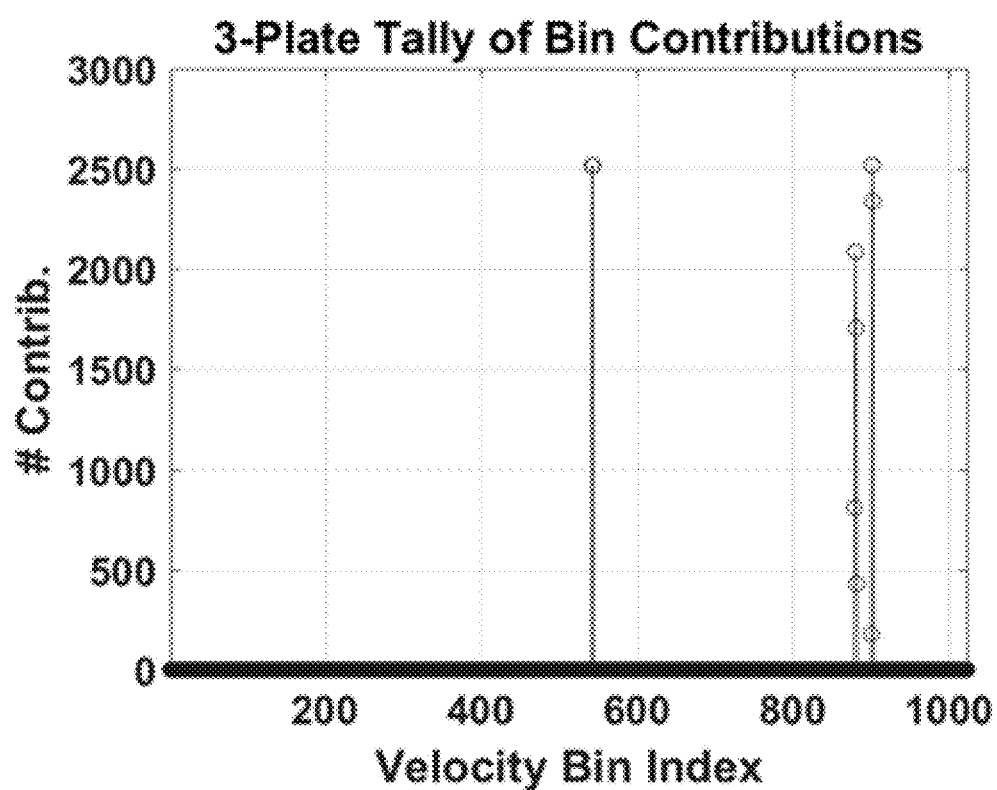
FIG. 21 depicts counts of ray contributions into individual velocity bins.
Figure 22:
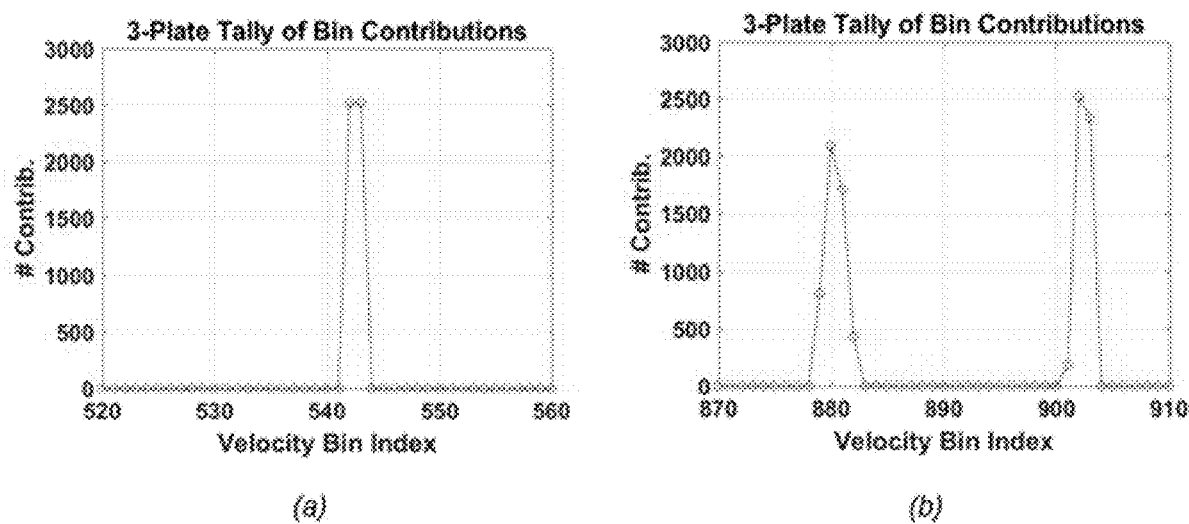
FIG. 22 depicts zoomed counts of ray contributions for plate 3 and plates 1 and 2.

The ADP simulation can also be configured to count and record the number of contributions into each velocity bin. These are shown in FIGS. 21 and 22. The tallies include the linear blending, so each ray contribution results in two tallies for the two neighboring bins. This information is not necessarily used for performing the extrapolation in post-processing, but it is interesting to observe. For this simple 3-plate configuration, most of the velocity bins receive no contributions; they are all concentrated into a handful of the 1024 velocity bins. In FIG. 22a, two bins receive contributions associated with Plate 3, and that makes sense given the bin blending. However, in FIG. 22b, the contributions for Plates 1 and 2 are each spread over 3 or 4 velocity bins. That is because of their lateral shift relative to the Tx/Rx pair. Different parts of these 2 m×0.5 m plates have different dR/dt for the complete ray path, and the resolution of the velocity bins is sufficient to begin showing that.

Using the velocity binned output, a system in one embodiment can extrapolate coherent coupling from Tx to Rx to time samples across the CPI, approximately recovering the time response in FIG. 8. In one example, the steps for doing this are as follows: Inverse Fast Fourier transform (IFFT) the velocity response from the ADP simulation to produce $N_{vb}$ time samples for t>=0. The IFFT result domain will have a time interval $\Delta t=c/(f_c P_{vb})$ where $P_{vb}$ is the period of the velocity-bin domain. In this example, a system sets $P_{vb}=2 P_v$ (i.e., twice the monostatic velocity ambiguity of the radar being simulated), but in general $\Delta t$ depends only on how the velocity bin domain was configured. Forward Fast Fourier transform (FFT) the velocity response to produce $N_{vb}$ time samples for t<0. The FFT result domain will have the same time interval $\Delta t$. Extract the lower portion of each of these results (the portion near t=0) to construct a sequence of time response samples (with interval $\Delta t$) of sufficient span to encompass the pulse time samples of the CPI. Recall these have an interval $\Delta t_p$, so they will not necessarily line up with the result samples having an interval $\Delta t$. Because the system has oversampled at least 4x, the system may use no more than the lower one eighth (<$N_v$/8 samples) of the IFFT and FFT results, respectively. In some embodiments, this can mitigate the effects of velocity bin quantization error. Interpolate the constructed results with interval $\Delta t$ from the previous step onto the CPI time samples with interval $\Delta t_p$. The interpolation scheme may identify the margin of required samples beyond the extents of the CPI. A system uses linear interpolation here, so the constructed domain could use a margin between $\Delta t/2$ and $\Delta t$ beyond the CPI extents.

To explicitly demonstrate the extrapolation steps, the following discussion employs MATLAB® script syntax. First the velocity-binned results are loaded into MATLAB® structure variable, sv, which MATLAB® data structure has the form:

% sv (struct)
% .vel (1× $N_v$ dbl) velocities (−dR/dt) at center of each bin [m/s]
% .dv (dbl) velocity interval [m/s]
% .Pv (dbl) velocity period [m/s]
% .f_ghz (Nf×1 dbl) list of frequencies [GHz]
% .scat (Nf×Nv cplx) Rx signal
%

This example is single frequency, so $N_f$=1. Next, a system constructs a 1×$N_p$ vector, tm, with the CPI time domain samples.

dtp=18.67959e−6; % time interval between pulses
tm=(−105:104)*dtp; % CPI time domain samples A system establishes $\Delta t$, the time interval of the IFFT and FFT result domain when applied to the velocity bins.

fc_ghz=sv.f_ghz(1); % simulation frequency [GHz]
Pvb=sv.Pv;
dt=lightspeed/(fc_ghz*1e9*Pvb); % time interval [s]

Because the system chose $P_{vb}=2P_v$ in configuring the velocity-bin domain, it turns out that $\Delta t=\Delta t_p$ and interpolation could therefore be skipped. For the remainder, this description will use MATLAB® comment syntax to explain the steps, with reference to plots of intermediate results

```
%
% Determine interpolation index bounds for an interpolant domain with time
% interval dt.  Index it = 0 is the time sample centered on t = 0, and it is
% negative for negative times.
%
tmin = min(tm);
itmin = floor(tmin/dt);  % smallest index for interp,
                         % corresponds to lower interpolant
tmax = max(tm);
itmax = floor(tmax/dt) + 1;  % largest index for interp,
                             % corresponds to upper interpolant (hence, + 1)
%
% Create interpol-
ant domain of size Nt where Nt is even and where t = 0
% is the first element in the second half.
%
%                              Nt      Nt
%      1        2             ---     --- + 1      Nt - 1     Nt  <-- MATLAB
%  |        |        |         2       2        |          |        |
indices
%  |--------|--------|--//-|--------|--------|-//--|--------|--------|
%  |  -Nt   |  -Nt   |        |        |        |   Nt    |   Nt    |
%  |  ---   |  ---  + 1      -1        0          --- - 2    --- - 1|  <-- it
%  |   2        2                                    2         2    |
%  |--->      lower half    <---|--->    upper half           <---|
%
hNt1 = itmax + 1;  % number of bins to support the plus side
hNt2 = -itmin;     % number of bins to support the minus side
```

```
-continued
hNt = max(hNt1,hNt2) + 1; % pad with extra cell for safety during
interp
Nt = 2*hNt;
T0 = zeros(1,Nt); % symmetric domain with t = 0 cell in "middle"
```

At this point, the system has itmin=−106, itmax=105, and hNt=107. This means that from the 1024-point result of the IFFT, only the first 107 samples will be used, or roughly 10%, and similarly for 1024-point result of the FFT.

```
%
% Generate interpolants for t>=0 using IFFT.
%
% The velocity bin domain loaded from Savant always
    puts the zero-velocity
% bin in the middle (if Nvb is odd) or in the first bin of
    the second half
% (if Nvb is even). Move the v=0 bin to the first bin.
%
Vos=ifftshift(sv.scat,2);
% MATLAB ifft applies 1/N scale factor, which should be
    undone.
Tos=length(Vos)*ifft(Vos,[ ],2);
```

Figure 23:
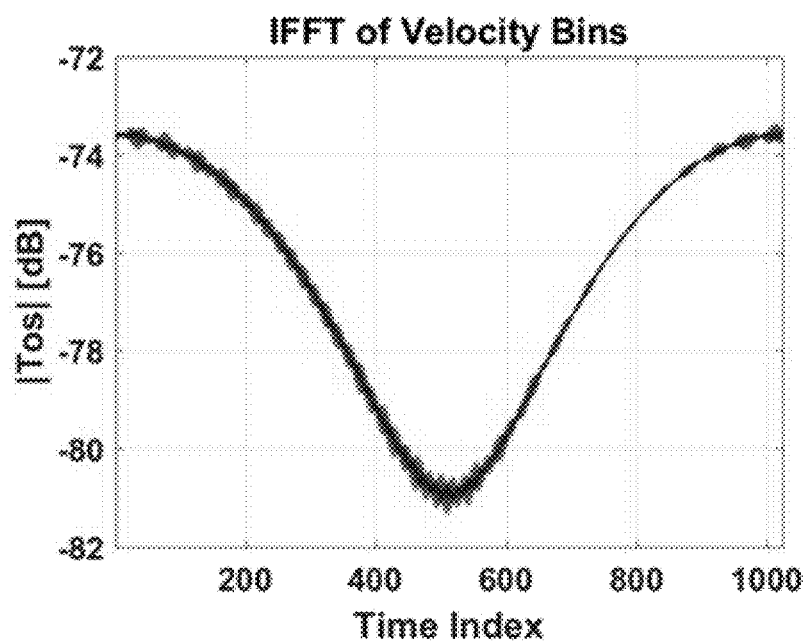
FIG. 23 illustrates an IFFT of the velocity bin output.

FIG. 23 depicts a plot of an IFFT of the velocity bins output.

```
% Insert the leading Nt/2 samples into the second half of
    the interpolant
% domain.
T0(:,(hNt+1):end)=Tos(:,1:hNt);
```

Figure 24:
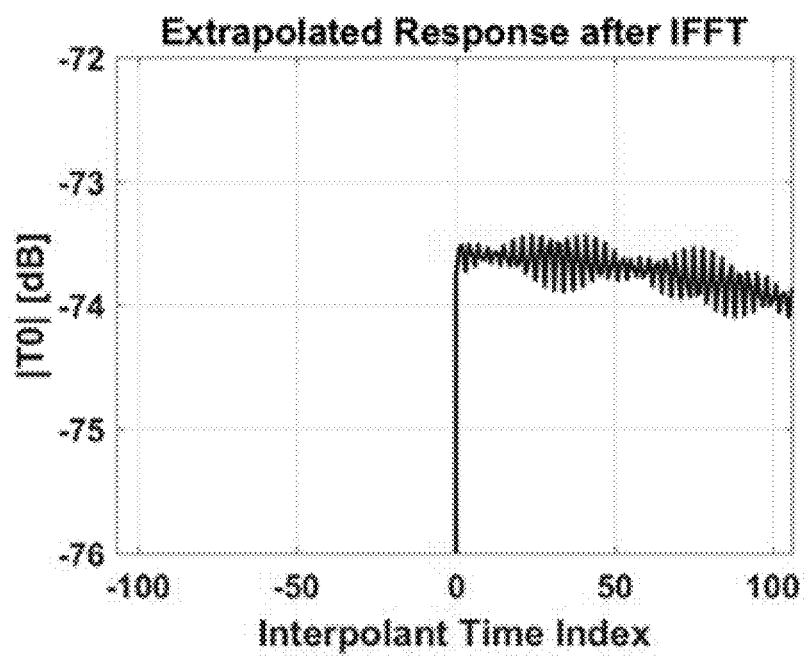
FIG. 24 depicts a partial extrapolated time response after IFFT for t>0.

FIG. 24 depicts a partial extrapolated response after IFFT for t>0.

```
% Generate interpolants for t<0 using FFT;
% MATLAB fft does not apply 1/N scale factor, so is not
% undone.
Tos=fft(Vos,[ ],2);
```

Figure 25:
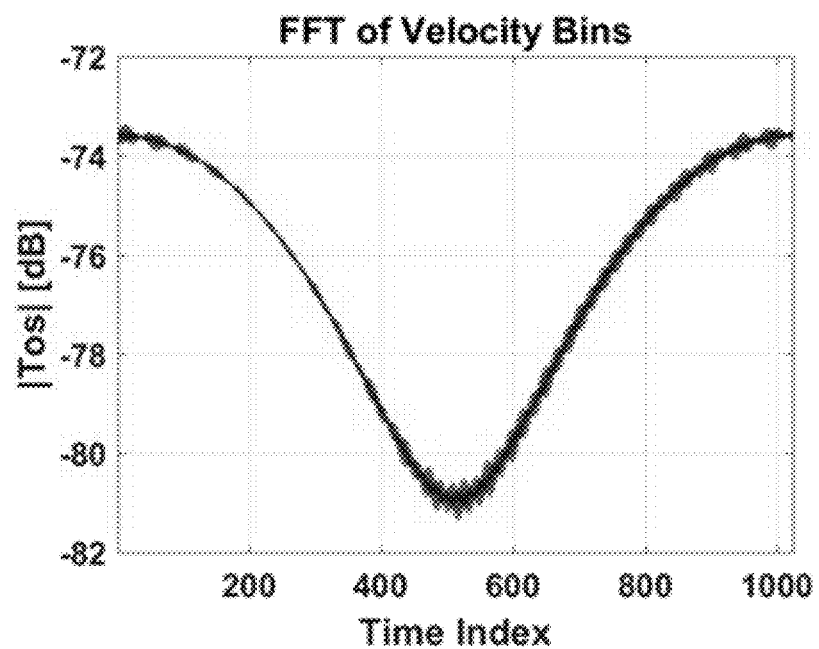
FIG. 25 illustrates an FFT of the velocity bin output.

FIG. 25 depicts an FFT of the velocity bins output.

```
% Insert the leading Nt/2 samples into the first half of the
    interpolant
% domain, but going backwards from the middle. The first
    cell of the FFT
% result (t=0) will be identical to that of the IFFT result
    (t=0), so
% a system can skip it. Instead, take the Nt/2 samples
    starting at Cell 2.
T0(:,hNt:−1:1)=Tos(:,2:(hNt+1));
```

Figure 26:
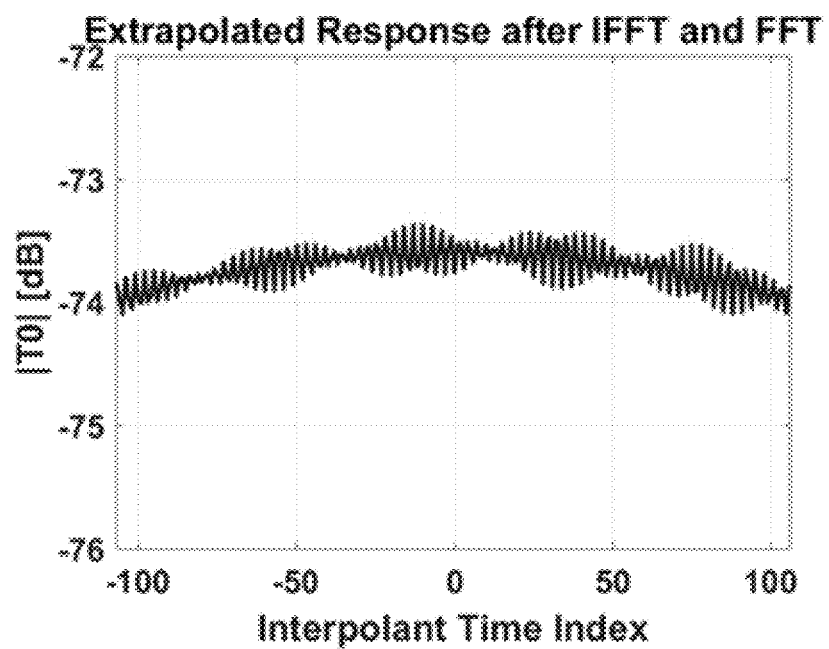
FIG. 26 depicts an extrapolated response after IFFT and FFT for t>0 and t<0, respectively.

FIG. 26 depicts an extrapolated response after IFFT and FFT for t>0 and t<0, respectively.

```
% Interpolate T0 onto the requested time samples, tm.
Nt0=length(tm);
rx_sgnl=zeros(1,Nt0);
ait=tm/dt+(hNt+1); % 1×Nt, unrounded interpolation
    index
it_lower=floor(ait); % lower interpolant
ait=ait−it_lower; % fractional component of interpolation
    index
it_upper=it_lower+1; % upper interpolant
rx_sgnl=T0(:,it_lower).*(1−ait)+T0(:,it_upper).*ait;
```

The cost of this extrapolation post-processing is insignificant compared to the cost of the ADP ray-tracing simulation that produces the velocity-binned output. The most computationally intense part of the post-processing is performing the IFFTs and FFTs, and these are well known to be quite inexpensive (nearly free in this context).

Figure 27:
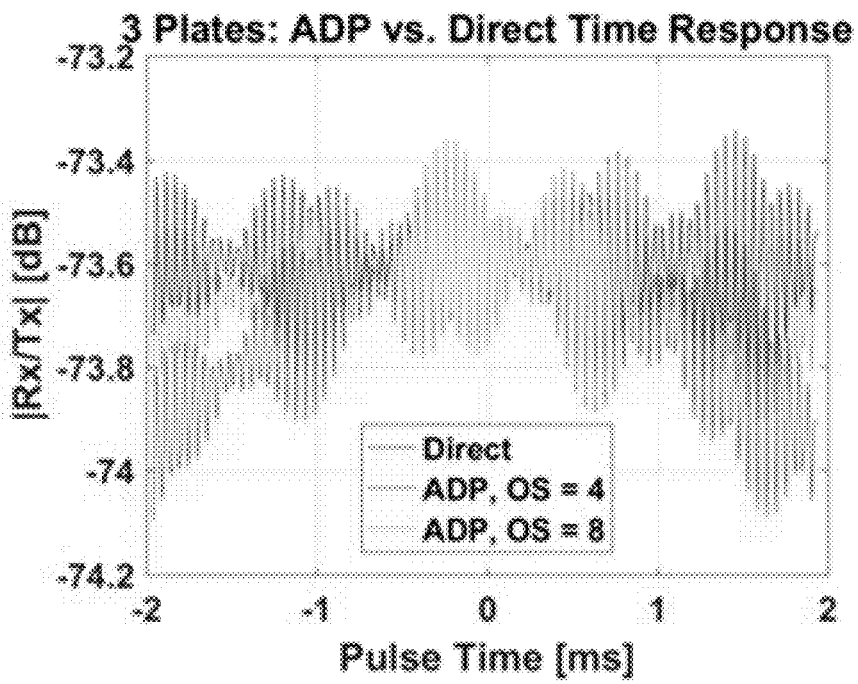
FIG. 27 depicts a comparison of an ADP extrapolated time response with that obtained from a full simulation over one CPI illustrating the full CPI and a zoomed view near t=0.
Figure 27:
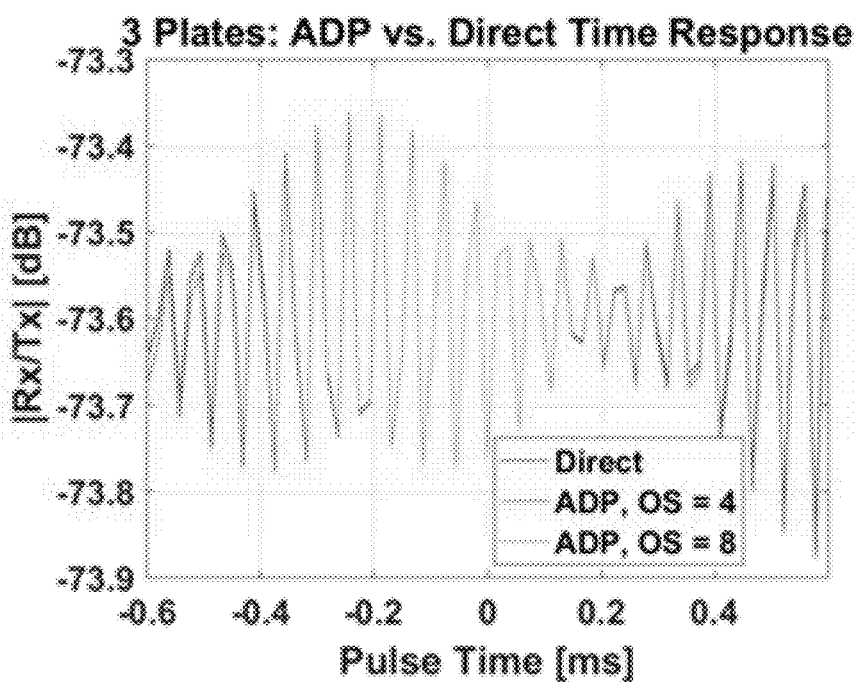

FIG. 27 compares the pulse time response extrapolated via the ADP simulation (as yielded in rx_sgnl at the end of the foregoing MATLAB® code, red and green traces) with that obtained earlier (see FIG. 8) via direct time-stepped simulation of the individual pulses (blue trace). The red trace is based on the 1024 velocity bin extrapolation, which represents nominally 4× oversampling. The agreement is excellent nearest t=0, but divergence progressively emerges when heading toward earlier or later times. The divergence is somewhat exaggerated by the 1-dB vertical scale. The divergence manifests in a way that is reminiscent of a window function, but these are un-windowed results. Instead, the illustration manifests bin quantization error, which is entirely consistent with the divergence disappearing when approaching t=0. The green trace is the extrapolated result obtained when the oversampling is doubled to 2048 velocity bins (without changing $P_{vb}$). The fact that this improves the agreement with direct simulation serves to confirm that the divergence is caused by bin quantization error. It is therefore significant that increasing the oversampling has no impact on the ADP simulation time. It only requires more memory to hold the velocity-binned output and slightly more expensive post-processing for the doubled size of the IFFT and FFT domains.

Figure 28:
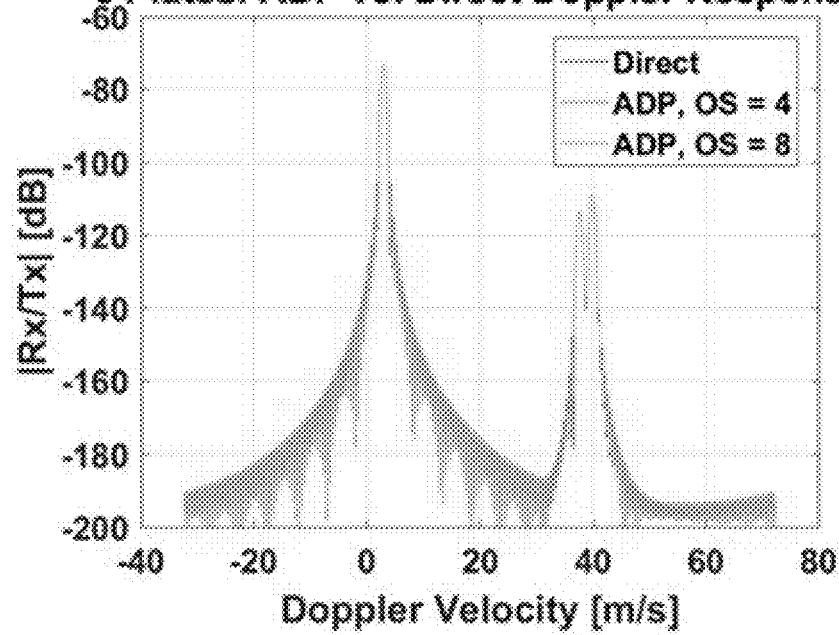
FIG. 28 depicts a comparison of Doppler responses using ADP with Doppler responses using full simulation of all pulses of a CPI.
Figure 28:
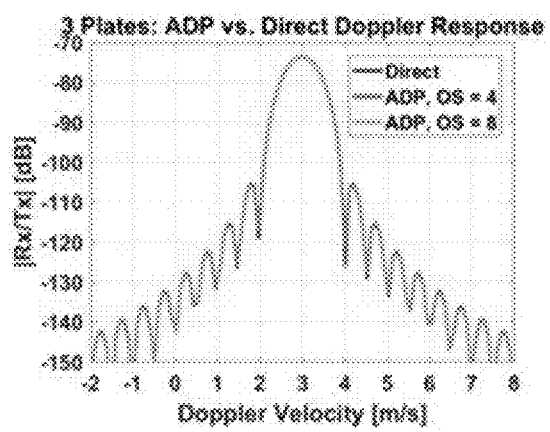
Figure 28:
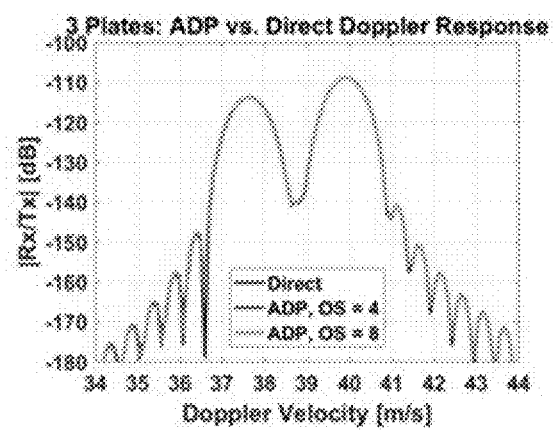

Following a similar procedure established earlier with the direct simulation time response, a system converts the ADP time response into a Doppler response. These results are shown in FIG. 28 in comparison with the Doppler response based on direct simulation of the individual pulses. As in FIG. 17, the system has set the center velocity to 20 m/s. The agreement is strong.

Figure 29:
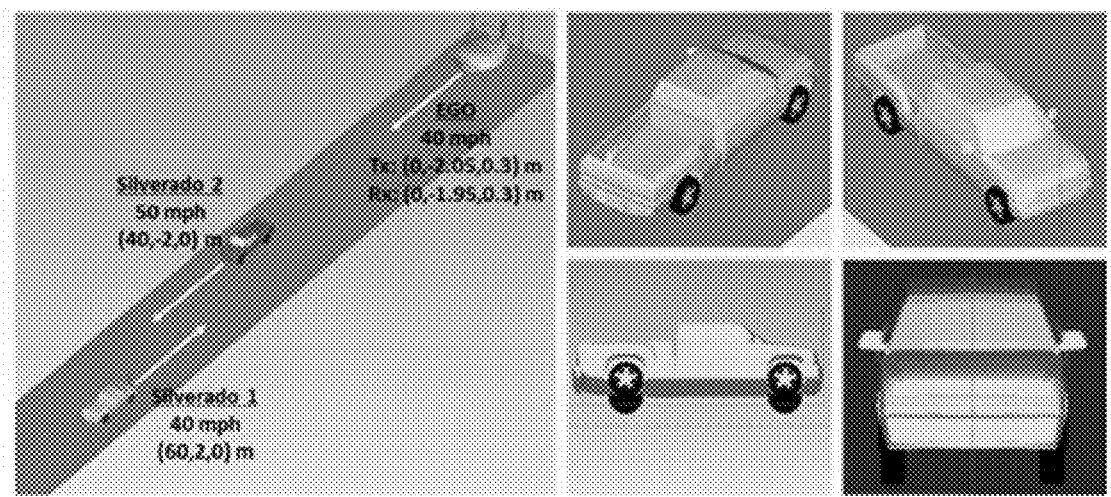
FIG. 29 illustrates a scenario with two pickup trucks and a transmitting vehicle.

A second example (Example 2) is illustrated in FIG. 29. The example depicts two pickup trucks on a strip of asphalt highway measuring 180 m long. The EGO vehicle is traveling at 40 mph. Its Tx and Rx antennas are configured identically as in the first example; they are separated by 10 cm and sit 30 cm above the road. Truck #2 (blue) is traveling at 50 mph in the same lane and same direction. Its front bumper is 40 m from the EGO Tx/Rx antennas, placing the rear bumper and tailgate about 34.2 m in front of the radar antennas. Truck #1 (yellow) is oncoming at 40 mph in the opposite lane from a distance of 60 m.

The asphalt highway is modeled as a half-space material with dielectric constant $\varepsilon_r$=3.18 and loss tangent tan $\delta$=0.0314. The rubber tires are also modeled as half-space, with $\varepsilon_r$=3.5 and lossless (tan $\delta$=0). The car body and windows are modeled as perfect metal. This example uses the same radar parameters as in the first, summarized here: $f_c$=76.5 GHz; CPI=3.9227 ms; $\Delta t_p$=18.6796 μs; $N_p$=210; $R_v$=0.4995 m/s (velocity resolution); $P_v$=104.8967 m/s (velocity ambiguity or period).

Direct simulation of the 210 pulses using batch processing required 28.04 min on a modern laptop computer with 4 physical cores and configuring the use of 7 threads in a multi-threaded implementation at a ray density of 0.2 rays-per-wavelength and with maximum number of bounces set to 5. This results in 3.47 million contributing rays. Table 3 provides the rays statistics for the t=0 pulse. Due to small changes in the relative positions of the Tx antenna, the vehicles, and the road with neighboring pulses before and after t=0, the other pulses have slightly different ray tallies but are similar.

TABLE 3

Ray statistics for t = 0 simulation.

| Num. Bounces at Escape | Num. Ray Tracks |
| --- | --- |
| 1 | 3,286,846 |
| 2 | 51,397 |
| 3 | 43,662 |
| 4 | 6005 |
| 5 | 10,650 |
| Exceed Max | 67,021 |

Figure 30:
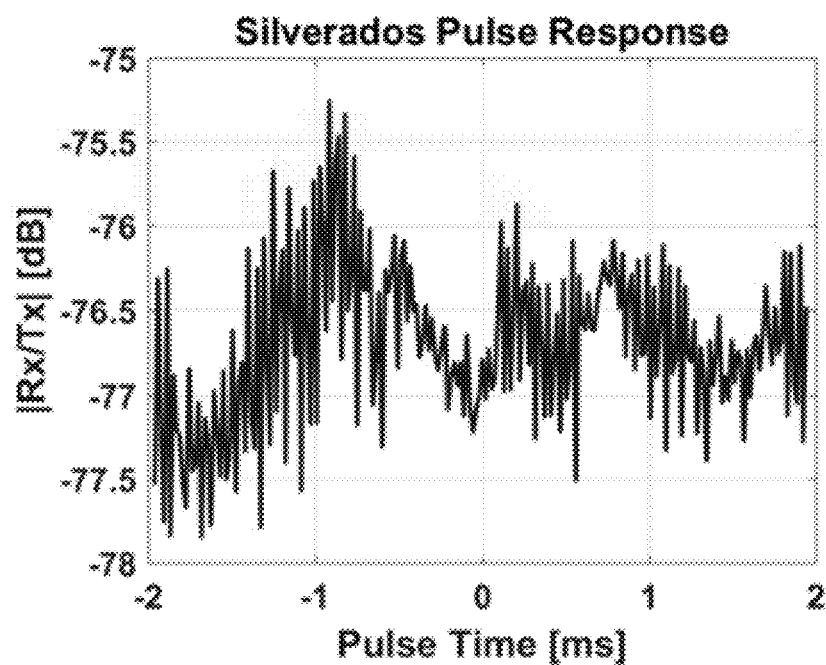
FIG. 30 shows a CW time response over one CPI.

The time response for one CPI is shown in FIG. 30. It is much more complicated than the 3-plate CPI response shown in FIG. 8, with no obvious trends.

Figure 31:
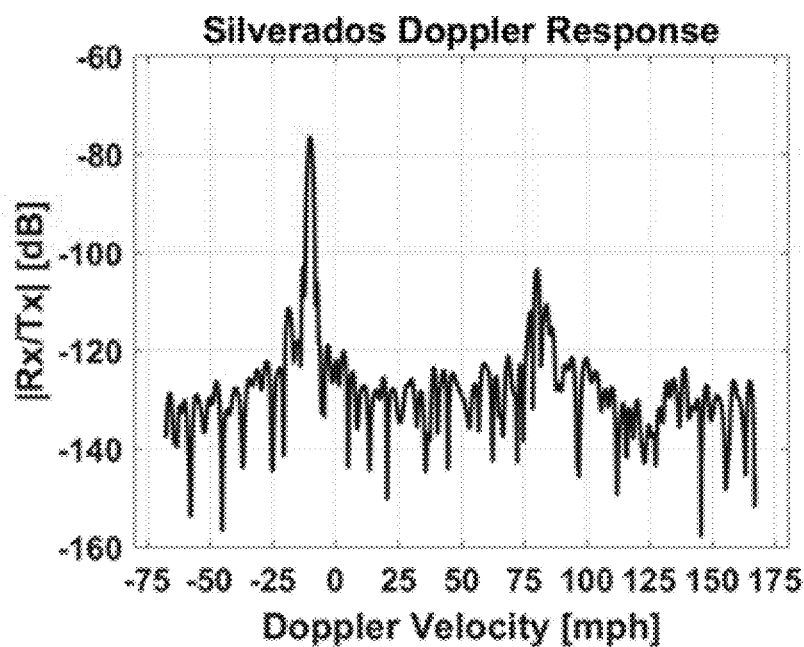
FIG. 31 depicts a Doppler velocity response over one CPI.

The corresponding Doppler response, obtained by the same post-processing procedure detailed earlier, is shown in FIG. 31. This time, the velocity axis is scaled in miles-per-hour (mph) and places the center velocity at 50 mph (relative to the EGO vehicle). The features for truck #2 (receding the radar at 10 mph) and truck #1 (approaching at 80 mph) are evident. One might also expect to see some road return near 40 mph because that is the speed of the EGO vehicle, yet none is evident. Overall, the response appears to have a significant "noise floor" when compared with the Doppler response for the 3-plate configuration (see FIG. 9).

Figure 32:
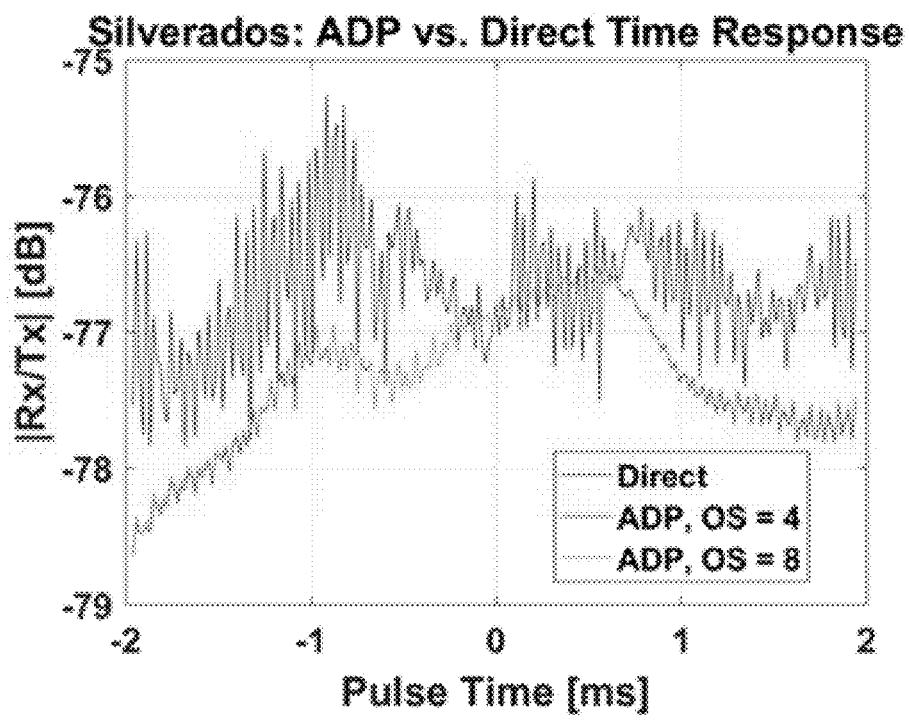
FIG. 32 shows a comparison of ADP time response with results from direct simulation for a full CPI and zoomed near t=0.
Figure 32:
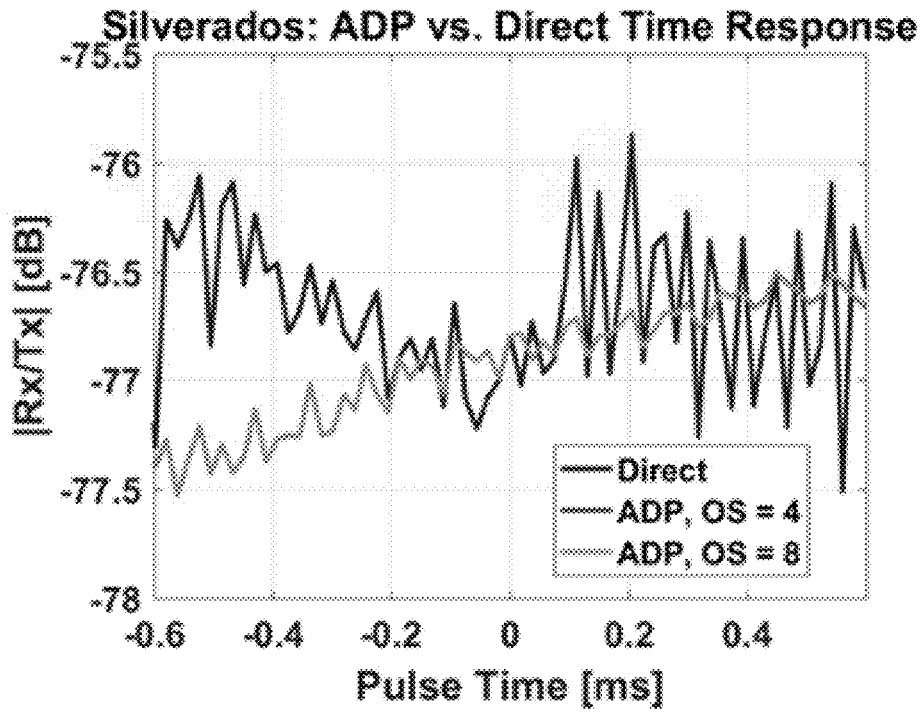

The time response obtained via ADP simulation is shown in FIG. 32 for both 4× and 8× oversampling, compared with direct simulation of the pulses. While the ADP simulation responses have roughly the same overall strength as that from direct simulation, the shape and trend is completely different, even near t=0 (they do however match at precisely t=0, which will always be the case). Moreover, the direct simulation result shows much wider swings in levels from pulse to pulse than the ADP responses. This discrepancy is caused by ray jitter in the direct simulation, as will be explained after comparing the Doppler responses.

Figure 33:
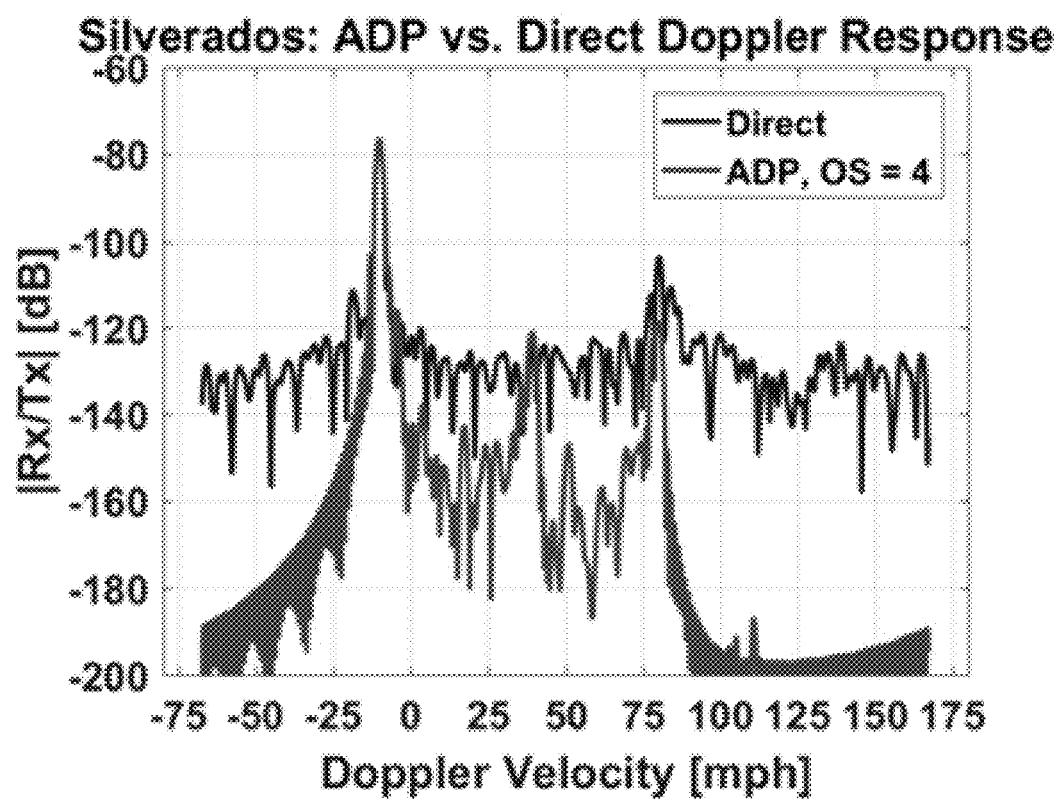
FIG. 33 depicts a comparison of a Doppler response generated using ADP versus a direct simulation.

FIG. 33 contrasts the Doppler response generated via ADP with that from direct simulation. For clarity, only the ADP result with 4× oversampling is shown; the response from 8× oversampling exactly overlays it. One can see that with ADP simulation, the anticipated Doppler features are much more clearly revealed, and the return from the road near 40 mph (because that is the EGO vehicle speed) is now quite evident. Overall, the "noise floor" of the response is much lower using ADP.

The reason that direct simulation produces an inferior Doppler response is a loss of ray coherence between pulses. This problem was not observed in the 3-plate configuration of the first example. However, the geometric configuration of the 2-truck scenario is more complicated. With each time step, most rays will hit the same surfaces and only the hit points, distances, and angles will change slightly. When this occurs, one can say a ray track maintains coherence between pulses. However, a small fraction of ray tracks will lose coherence. For example, a ray track in the previous time step may completely disappear in the current time step because the surface of a moving part started blocking the path to its first-bounce hit point. The opposite can also occur. Alternatively, a single-bounce ray track in the previous time-step may become a multi-bounce ray track in the current time-step because the last hit point and exit ray direction shifted enough to now hit something else that was already in the scene. None of the rays de-cohered in the 3-plate configuration because the geometry was too simple. All the rays were single-bounce rays that always hit the same points on each plate, and the plates were arranged relative to the Tx antenna to prevent any opportunity for multi-bounce interaction between them. However, the truck scenario provides ample opportunity of ray de-coherence, also known as "ray jitter".

Because this only happens for a small fraction of rays, it might not make a big difference in the composite scattering contribution from all the rays. However, the changes occur abruptly between pulse time steps. The ray tracks do not gradually de-cohere; they abruptly de-cohere. This creates "high frequency" noise in the response. The Fourier processing in going from the time domain to the Doppler velocity domain is very effective at elevating this high frequency noise, creating widespread artifacts in the Doppler domain. This explains the elevated "noise floor" of the direct Doppler response in FIG. 33.

ADP simulation can address this problem because it uses a single ray set for all pulses across the CPI. The ray tracks are stretched or compressed, but they never de-cohere. ADP therefore can provide in some embodiments massive acceleration and significant reduction of artifacts in the Doppler response. The ADP simulation for the 2-truck scenario took 9.55 s each on the same computer hardware for the 4× and 8× oversampling configurations, or 196× faster than the 22.04 min needed for direct simulation at the same ray density. This nearly matches the anticipated 210× acceleration.

In Example 1, the system simulated at a single frequency, effectively modeling a very wide pulse that provided no information about distance (range) to the targets. Example 3 updates the three-plate case by switching to a narrow pulse while maintaining the same Doppler properties. The target range resolution and ambiguity are $R_r=1.0$ m and $P_r=200.0$ m. Using Eq. (1), a system finds this implies a bandwidth of BW=149.8962 MHz. Also, because $P_r/R_r=200$, this means a system uses $N_f=200$ frequency samples across the bandwidth, and $\Delta f=BW/N_f=749.4811$ kHz. In order to maintain the same Doppler processing CPI and $\Delta t_p$, the system keeps the center frequency at $f_c=76.5$ GHz. Because $N_f$ is even, and following the above described framework with FFT processing, the system places $f_c$ as the first point in the second half of the 200-point frequency sweep (i.e., $f_c$ is the 101st frequency sample). This is not strictly necessary, and the system could also be implemented where the 100th and 101st frequency samples straddle $f_c$. The system selects the former to maintain a consistent approach in the placement of samples in even-sized FFT domains when targeting a center quantity, whether considering time, frequency, or velocity.

Based on the foregoing, a system implements $f_1=76.425051886$ GHz, $f_{101}=76.5$ GHz, and $f_{200}=76.574198633$ GHz. One might state that the bandwidth is then BW=$f_{200}-f_1$=199$\Delta f$=149.1467 MHz instead of 149.8962 MHz. Similarly, one might have stated that the CPI is really $(N_p-1)\Delta t_p$ instead of $N_p\Delta t_p$. However, in the context of IFFTs and FFTs of size N, calculations work out more consistently when relating quantities like $\Delta f$, BW, $\Delta t$, and $P_t$ through a factor of N rather than sometimes using N−1 and then making corrections of the form N/(N−1), etc. Put another way, it is simpler if one thinks of the $N_f$ frequency samples as sampling a continuum, where each sample $f_i$ stands in for the frequency interval of width $\Delta f$: $[f_i-\Delta f/2, f_i+\Delta f/2]$. In that case, the $N_f$ frequency samples stand in for the frequency range $N_f\Delta f=BW$, and thus BW does not equal $(N_f-1)\Delta f$.

A more critical possible objection is that $\Delta f=PRF$ (pulse repetition frequency), or should be. Implicit in any FFT domain pair, such as frequency and time, is that both domains are discrete and periodic. Because the frequency domain is discrete, the implied time domain is periodic. Thus, discrete frequency sampling at an interval $\Delta f$ implies the pulses repeat in time with a frequency PRF=$\Delta f$. Here, the system uses PRF=$\Delta f$=749.4811 kHz. However, as was illustrated above using Eq. (4), the Doppler ambiguity specification of $P_v$=104.8967 m/s implied that PRF=$1/\Delta t_p$=53.5344 kHz. A real system cannot simultaneously operate at two different PRFs, so this is not realizable.

This PRF discrepancy can be reconciled by either setting $\Delta f$=53.5344 kHz, $1/\Delta t_p$=749.4811 kHz, or compromising by changing both to some intermediate quantity. If a system sets $\Delta f$=53.5344 kHz, then range ambiguity $P_r$ increases by a factor of 14 to 2800 m. While that improves the system performance, it also increases $N_f$ by a factor of 14 to 2800, making significantly more work for the simulation. Alternatively, if the system sets $1/\Delta t_p$=749.4811 kHz, this decreases $\Delta t_p$ by a factor of 14. This increases (improves) velocity ambiguity $P_v$ by a factor of 14, but now the system simulates $N_p$=2940 pulses (CPI time steps) instead of 210 pulses. For the direct approach, this creates 14× more simulation work. With ADP simulation, where the time steps are extrapolated using FFTs, the cost is not significant. It may not even require more memory to hold a 14× larger velocity-bin domain because there is no requirement that $P_{vb}$=2 $P_v$. Although a system sets $P_{vb}$=2 $P_v$ in Examples 1 and 2, $P_{vb}$ may actually be set to encompass all possible ray velocities dR/dt that the scenario will encounter, a property that does not change with the specifications of the radar being simulated.

By maintaining a self-consistent PRF, a system can be implemented where $P_r$ and $P_v$ are not independent but, instead, connected via Equations (3) and (4) through a common PRF. However, if it is sufficient to produce results satisfying a particular $P_r$ and $P_v$ that imply different PRFs, then a system can implement the inconsistent PRFs in the interest of simulation efficiency. That is, a system simulates a radar system whose range-Doppler ambiguity performance specification is below what is theoretically possible.

To summarize, a pulse-Doppler system is simulated with the following specifications:

| Range Specs | |
|---|---|
| $f_c$ = 76.5000 GHz | nominal center frequency |
| BW = 149.8962 MHz | last - first + $\Box$f |
| $PRF_{rng}$ = 749.4811 kHz | range PRF >= Doppler PRF |
| $N_f$ = 200 | |
| $R_r$ = 1 m | monostatic range resolution |
| $P_r$ = 200 m | monostatic range ambiguity period |
| Doppler Specs | |
| CPI = 3.922714 ms | duration of coherence processing interval |
| $\Delta t_p$ = 18.67959 µs | interval between pulses (start-to-start) |
| $N_p$ = 210 | |
| $PRF_{Dop}$ = 53.5344 kHz | Doppler PRF |
| $R_v$ = 0.4995082 m/s | monostatic Doppler velocity resolution |
| $P_v$ = 104.8967 m/s | monostatic Doppler velocity ambiguity period |
| Design Margin = 14.0 | $PRF_{rng}/PRF_{Dop}$ >= 1 |

Figure 34:
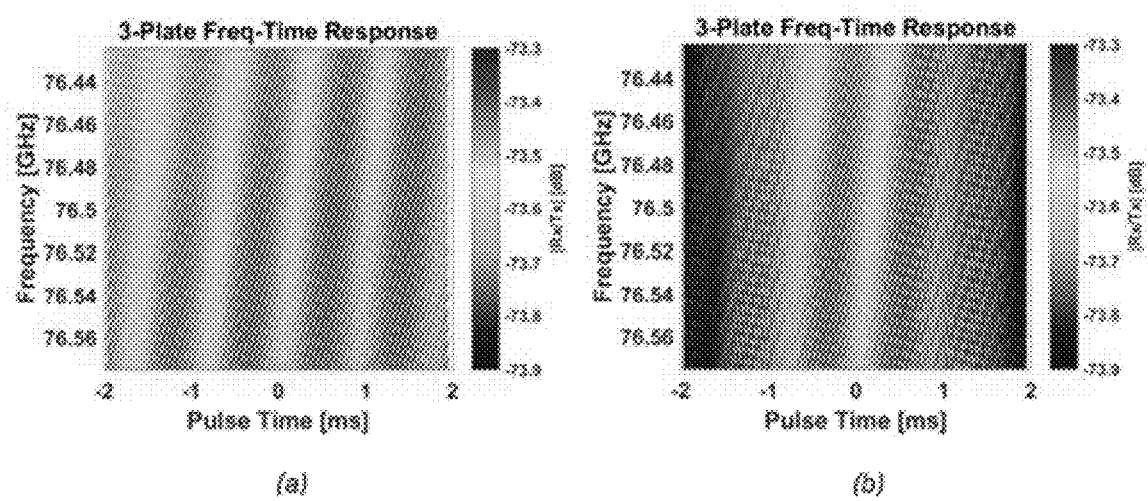
FIG. 34 illustrates a frequency-time response in the 3 plate scenario over one CPI for a frequency sweep using direct simulation and then ADP.
Figure 35:
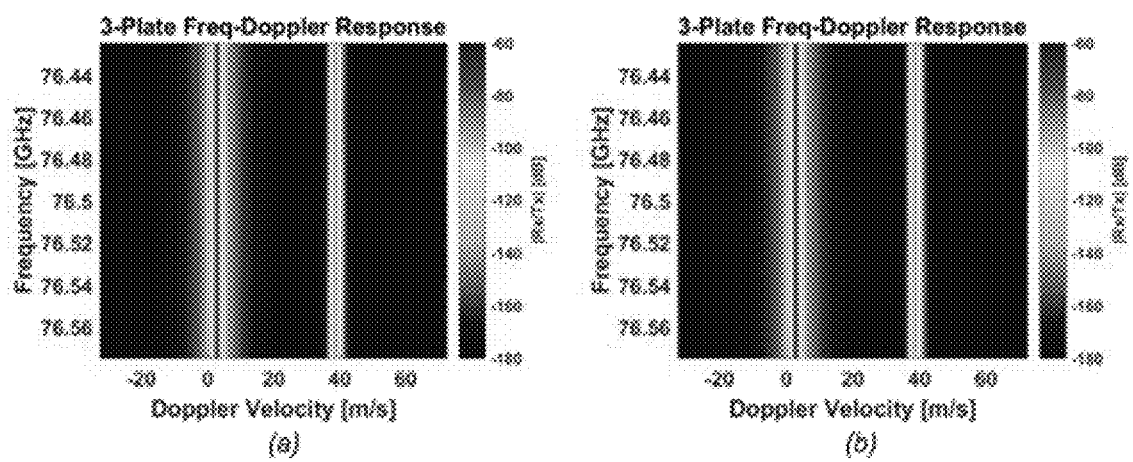
FIG. 35 depicts a frequency-Doppler response for the 3 plate scenario using direct simulation and then ADP.
Figure 36:
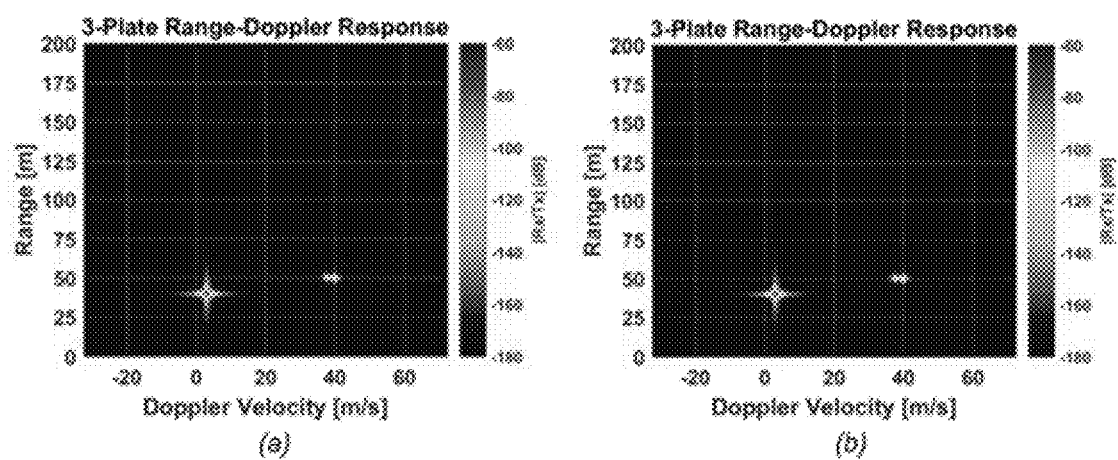
FIG. 36 depicts a range-Doppler image of the 3 plate scenario using direct simulation and then ADP.

The three-plate configuration was simulated with these radar specs, both directly and via ADP with 4× oversampling (i.e., $N_{vb}$=1024). For ADP simulation, the velocity bin configuration does not change, but now each ray contribution to a bin has a frequency dependence that is computed in the usual fashion of the base ray-tracing simulation. The velocity-bin output is thus the response vs. frequency vs. velocity-bin. In FIGS. 34-36, direct and ADP simulation results are compared side-by-side. Direct simulation, shown on the left-hand side of FIGS. 34-36, required 373 secs with 7 CPU threads on a modern laptop computer with 4 physical cores. ADP simulation, shown on the right-hand side, required 3.49 s on the same computer hardware and multi-threading configuration, or 107× faster.

FIG. 34 shows the response magnitude versus frequency versus pulse time. Comparing the direct and ADP simulation responses, one can see that the responses matches well near t=0 but the ADP simulation result progressively attenuates moving forward or backward in time from t=0. This is consistent with the response comparison shown in FIG. 27, and again, the effect is magnified by the <1 dB magnitude scale.

To extrapolate the time response from the frequency swept velocity bins, the system performs the same extrapolation procedure described earlier based IFFTs and FFTs, repeating it separately for each frequency. In that extrapolation process in one example, the system establishes a time interval $\Delta t$ for the IFFT and FFT result domains. This determines the spacing of the interpolant domain that will be used to compute (via interpolation) the response at pulse time samples $t_i$ whose interval is $\Delta t_p$. In the single-frequency case of the first two examples, the system computed $\Delta t$ as dt=lightspeed/(fc_ghz*1e9*Pvb); % time interval [s]

where fc_ghz was set to 76.5 GHz. In conjunction with a frequency-dependent velocity bin response, the question arises as to how to set the frequency in the denominator in this expression for $\Delta t$. For the results shown here, the system chooses to keep the frequency fixed at $f_c$=76.5 GHz, resulting in the same $\Delta t$=18.6796 µs for performing the extrapolation at each frequency (and which also happened to equal $\Delta t_p$ because the system chose $P_{vb}$=2 $P_v$). However, a case can be made that a system should instead use the frequency that is currently being extrapolated across time, meaning that interpolant interval $\Delta t$ would vary by 0.20% across the frequency sweep. The rationale for doing it this way is that the phase progression associated with a particular ray velocity dR/dt depends on the frequency.

FIG. 35 shows the response versus frequency versus Doppler velocity. These were generated using a similar procedure described earlier for converting a time response over one CPI into a Doppler response, repeating it for each frequency in the sweep. Here, the complementary case can be made that the Doppler velocity domain sampling interval $\Delta v$ should depend upon the frequency instead of being fixed according to $f_c$. In that case, a system would interpolate the FFT result domain on to a common $\Delta v$ interval in order to maintain a rectangular display grid for the 2-D frequency-Doppler image. The case for doing so, however, is weaker owing to convention. Typically, the conversion for frequency-time "phase history" into range-Doppler images uses a fixed frequency ($f_c$) to set the Doppler result domain.

Next, to convert the frequency-Doppler image to a range-Doppler image, the system performs a 4× over-sampled (zero-padded) and windowed IFFT along the frequency sweep. Analogous to the conversion of the time axis to Doppler velocity via FFT, the system starts by applying a unit-energy window function (Hann) of size $N_f$ centered at $f_c$, shifts the $f_c$ sample to the first cell, zero-pads in the middle out to $N_{fft}$=1024, and then performs an IFFT. This results in a time response with T=0 in the first sample of the IFFT result domain, with $\Delta T$=$N_f/(N_{fft}$ BW)=1.3030 ns and monostatic $\Delta R$=c $N_f/(2 N_{fft}$ BW)=0.1953 m. In this application, it may be desirable to keep the range R=0 sample in the first cell, so no domain shift is necessary at the end to center the range period about R=0. The range-Doppler images are shown in FIG. 36. The three plate features are clearly resolved at the expected range and Doppler velocity coordinates, and the agreement is excellent between direct and ADP simulation.

Figure 37:
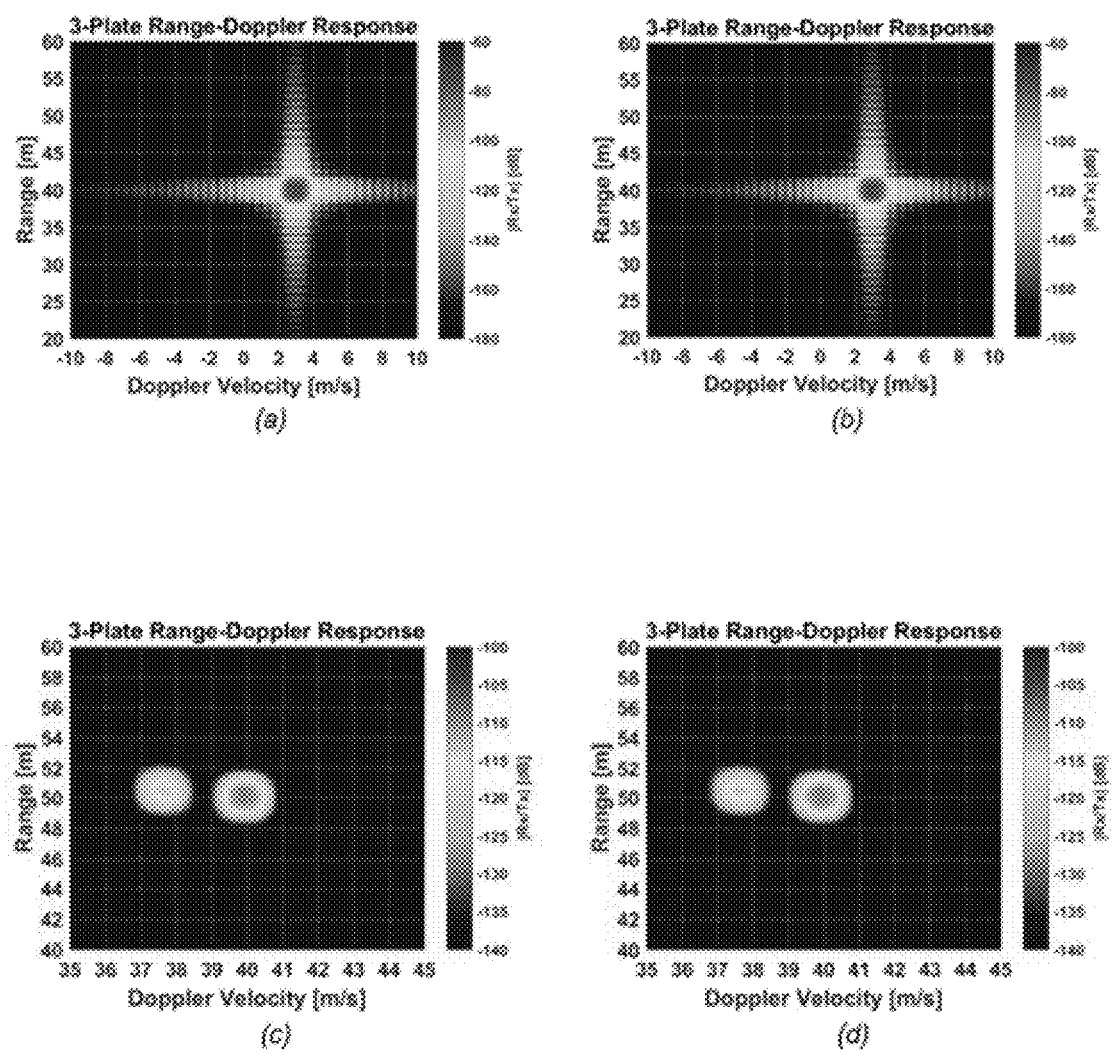
FIG. 37 depicts range-Doppler images of the 3 plate configuration using direct simulation at (a), (c), ADP at (b), (d), where the response due to plate 3 is depicted at (a), (b), and the responses due to plates 1 and 2 at (c), (d).

FIG. 37 depicts a zoomed in view of the Plate 3 feature (FIGS. 37a and 37b) and then the Plates 1 and 2 features (FIGS. 37c and 37d). At this color scale, the signal processing side lobes of the Plate 3 feature are quite evident and regular, indicating a near point-scatter response. In FIGS. 37c and 37d, the color scale has been adjusted to make the Plates 1 and 2 features clearer. Consistent with the Doppler response shown in FIGS. 9 and 10, Plate 2 backscattering is somewhat weaker than Plate 1 because of its greater lateral offset relative to the radar beams. This also explains why it appears slightly further down range than Plate 1, even though both are located at x=50 m.

In a fourth example (Example 4), the same pulse-Doppler radar specs from Example 3 were run against the two-truck scenario of Example 2 to generate range-Doppler imagery. Direct simulation with swept frequencies ($N_f$=200) required 231.1 minutes using 7 CPU threads on a modern laptop computer with 4 physical cores. With ADP simulation, the same swept-frequency simulation required 62 seconds on the same computer hardware and multi-threading configuration, or 224× speed-up. The speed-up factor is anticipated to be $N_p$=210; the small additional speed-up beyond that can likely be attributed to small variations in the machine background load when these compute times were observed.

Figure 38:
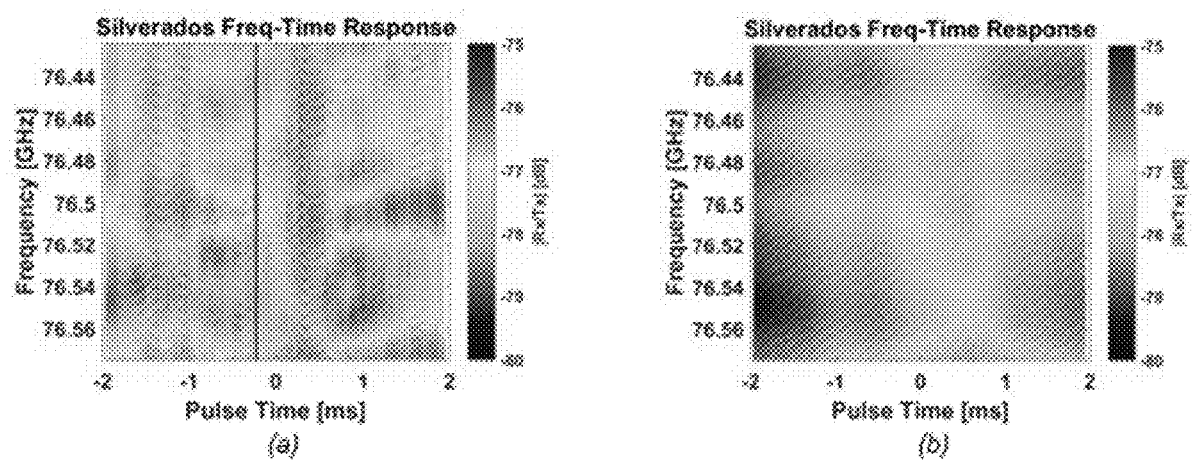
FIG. 38 depicts a frequency-time response of the truck scenario over one CPI for a frequency sweep using direct simulation and ADP.
Figure 39:
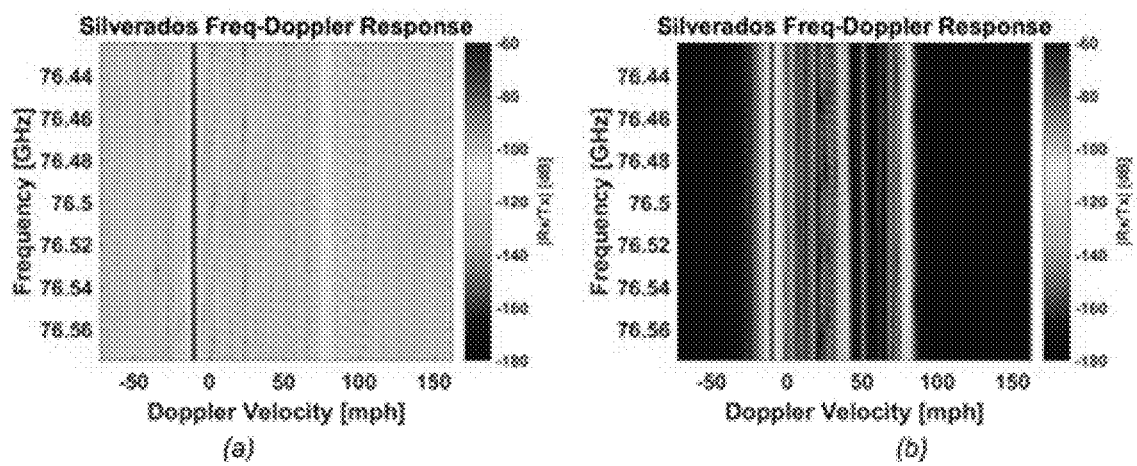
FIG. 39 depicts a frequency-Doppler response of the truck scenario using direct simulation and ADP.

The direct and ADP simulation results are shown side-by-side in FIGS. 38-41, with direct simulation results on the left and ADP results on the right. The frequency response vs. pulse time is shown in FIG. 38. As with the mono-frequency results in FIG. 32, the direct and ADP responses look very different in frequency-time space. FIG. 39 compares the frequency response versus Doppler velocity for direct and ADP simulation. As in FIG. 33, the ADP result does not suffer from an elevated "noise floor" caused by ray jitter. The road response is not sufficient to rise above the "noise floor" in direct simulation, but it can be clearly seen in the ADP result near Doppler velocity v=40 mph.

Figure 40:
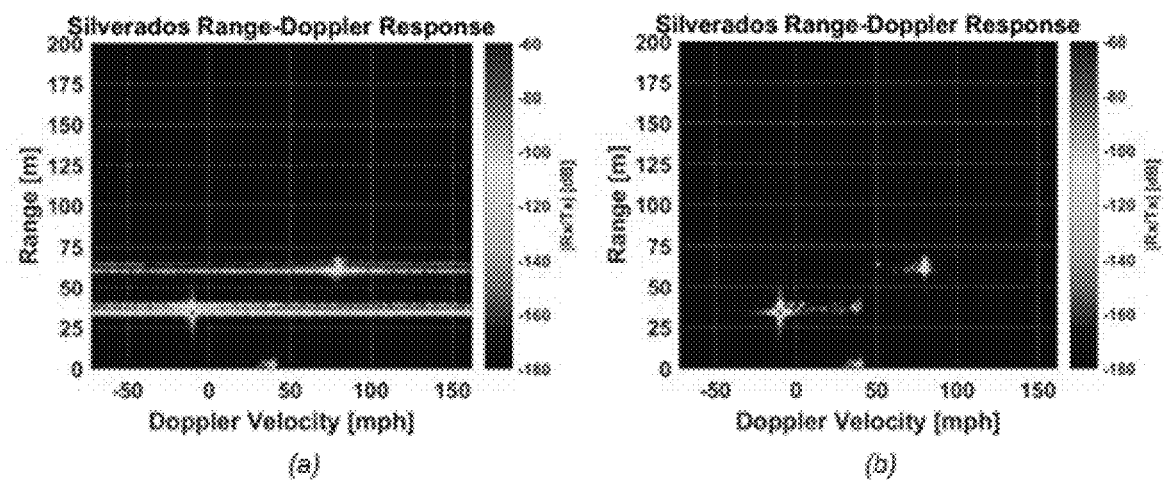
FIG. 40 depicts a range-Doppler image of the truck scenario using direct simulation and ADP.

In FIG. 40, the frequency-Doppler response is converted into a range-Doppler image using the same procedure described for Example 3. With direct simulation (see FIG. 40a), one can see that ray jitter only creates artifacts along the Doppler axis. The range axis is not spoiled by ray jitter because each frequency sweep uses a single ray set. That might not be the case if a system shot rays independently at each frequency sample because then the absolute ray density (measured in meters) might change with each frequency, causing ray jitter there as well.

Figure 41:
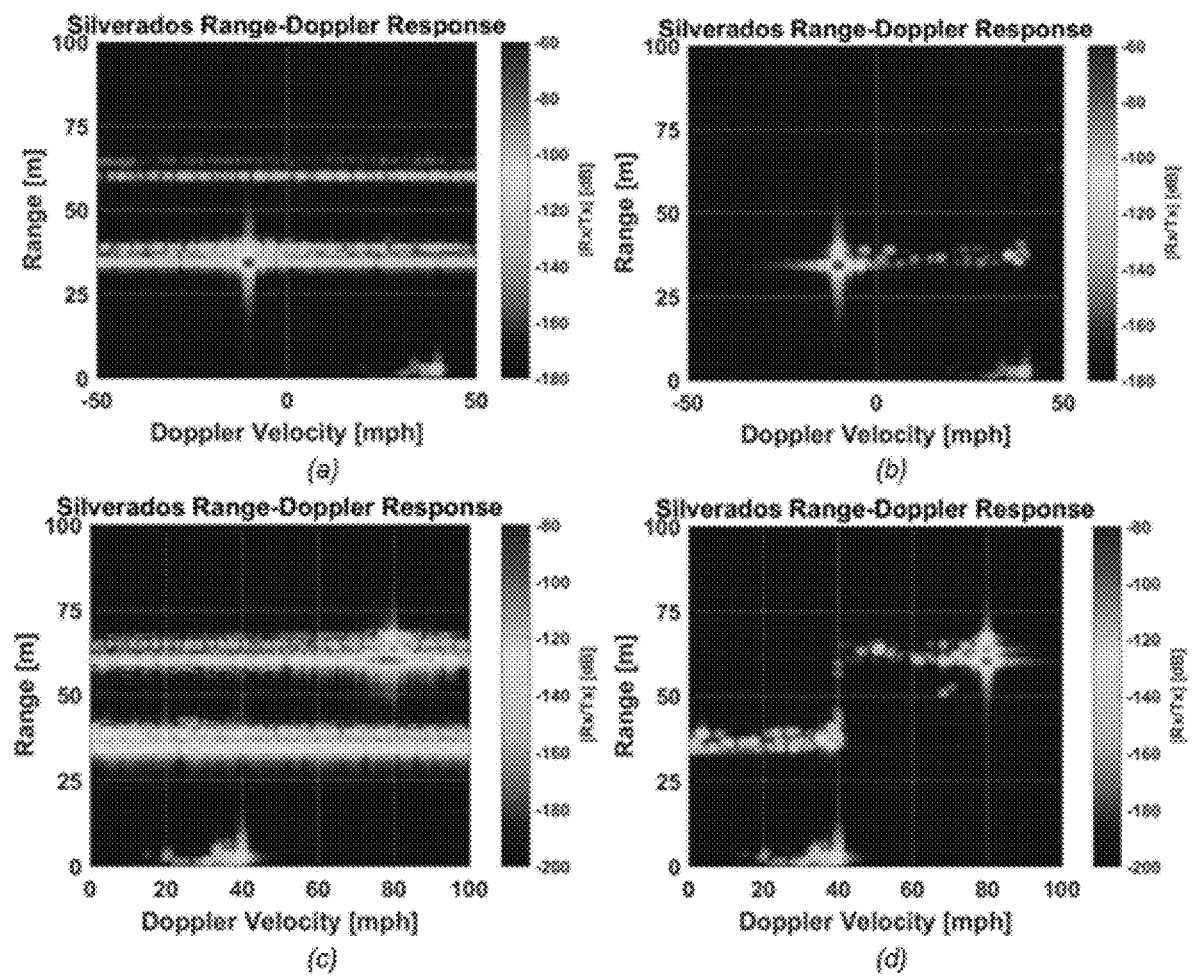
FIG. 41 depicts a range-Doppler image of the truck scenario using direct simulation at (a), (c), ADP at (b), (d), where responses primarily due to truck 1 are depicted at (a), (b) and responses primarily due to truck 2 at (c), (d).

In FIG. 41, the range-Doppler images are magnified to focus first on the truck #2 features (top) and then the truck #1 features (bottom). The ray jitter artifacts of direct simulation make it difficult to observe all but the strongest features of these targets. In the ADP simulation result one can see a trail of minor sub-features running horizontally (at nearly fixed range) between the relative velocity of the vehicle and the ground speed of the EGO vehicle (40 mph). In FIG. 41d for the approaching vehicle (truck #1), one can also observe its distributed range response. This makes sense because the radar is not looking head-on to truck #1 and can therefore observe scattering features along the side of the 5.8 m long pickup truck. Note that the color scale has been shifted down 20 dB in FIGS. 41c and 41d.

Figure 42:
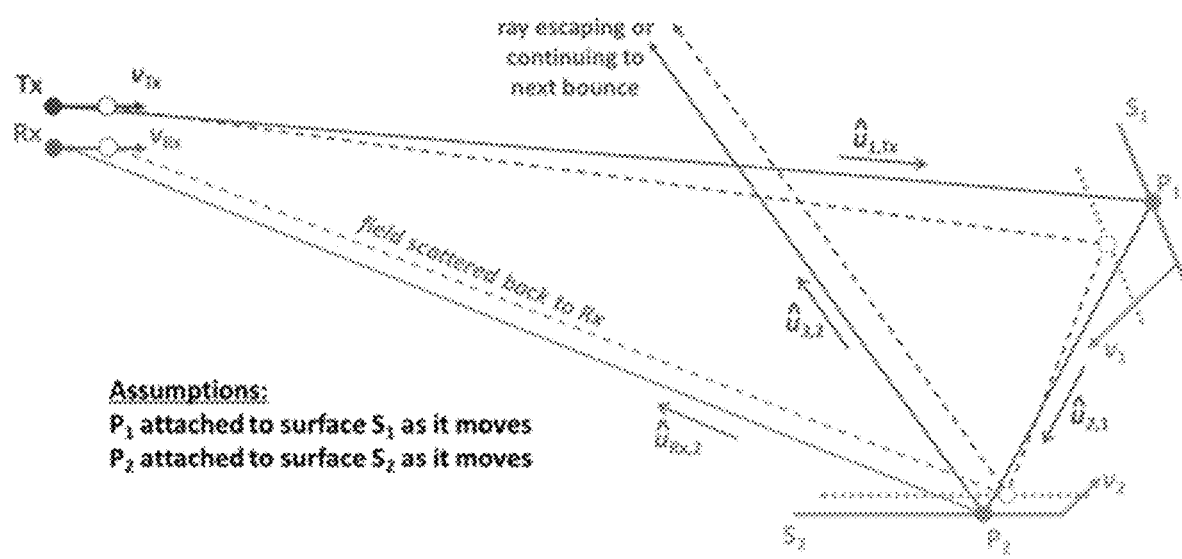
FIG. 42 is a depiction of an original and extrapolated ray path when the attached-point assumption is enforced for all hit points.
Figure 43:
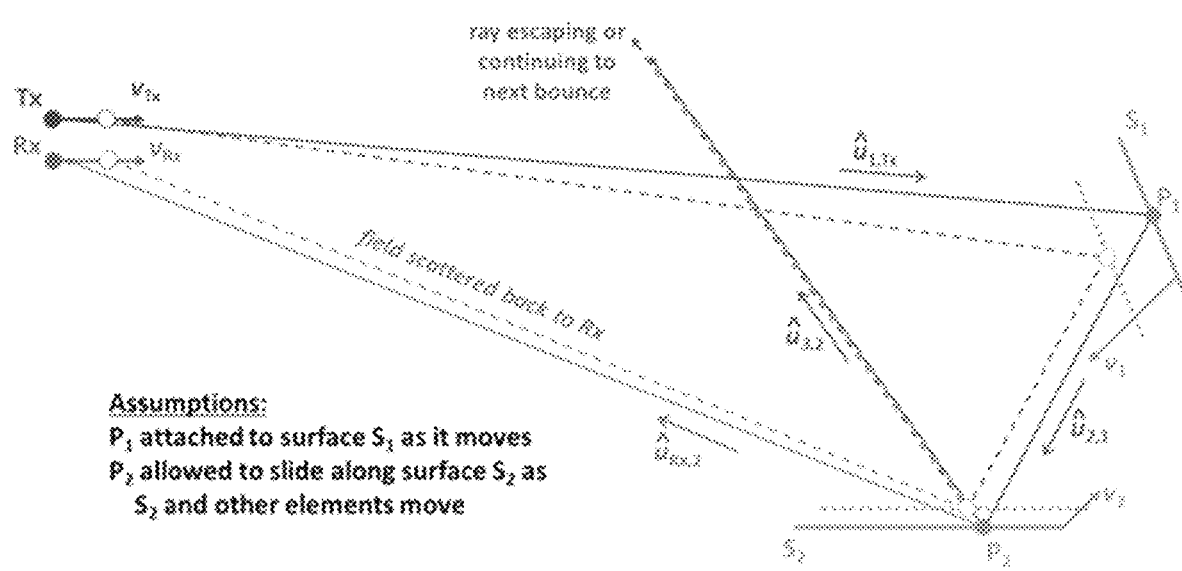
FIG. 43 is a depiction of original and extrapolated ray paths when the sliding-point assumption is enforced for a hit point at P2.

As described earlier, the computed ray "velocity" (i.e., the rate of change in the total ray path length from Tx antenna to Rx antenna, dR/dt) is used to select the nearest velocity bin(s) in which to accumulate ray contributions to the received signal. In the foregoing examples that demonstrate an embodiment of ADP, dR/dt is computed assuming that ray hit points are attached to the moving surfaces they have hit, meaning that they move with the same vector velocities as these surfaces. The steps for computing dR/dt under this "attached-point assumption" were earlier described in mathematical detail referencing FIG. 18, starting from the ray launch point at the Tx antenna and its vector velocity, continuing through to one or more ray hit points on object surfaces and incorporating their vector velocities, and culminating with the received-signal contribution ray (or scattered-field ray, dashed line in FIG. 18) extending from each hit point to the Rx antenna and incorporating its vector velocity. In many circumstances, this is a good assumption for determining the ray velocity of each received-signal contribution. However, the accuracy of results may be improved by assuming that some ray hit points are not attached to the moving surface they have hit but, instead, slide along those surfaces as those surfaces move and also as the surfaces of neighboring hit points move: the "sliding-point assumption". The two different assumptions are illustrated and distinguished in FIGS. 42 and 43 where object surface $S_1$ has a velocity $v_1$ at hit point $P_1$ and object surface $S_2$ has a velocity $v_2$ at $P_2$. (Because each surface will in general have rotational velocity, its instantaneous vector linear velocity varies from point to point on the surface. Although not drawn as extending precisely from $P_1$ for reasons of limited space, $v_1$ should be thought of that way, and likewise for $P_2$ and $v_2$.) After hitting at point $P_2$, the multi-bounce geometrical optics ray (blue line) either continues on to hit some other surface or escapes the scene. In FIGS. 42 and 43, the solid blue lines represent a geometrical optics ray path at time t=0 and the solid green line represents a scattered-field contribution path to the received signal from the second hit point at $P_2$ to the receiving (Rx) antenna at t=0. The dashed blue and green lines represent extrapolated ray paths where the Tx antenna, Rx antenna, and surfaces have all moved after a small time interval, Δt.

Depending upon details of the underlying ray-tracing methodology that has been implemented, there is, in general, a contribution to the received signal by each hit point along the multi-bounce ray track. In FIGS. 42 and 43, the mechanism of the ray hit point at $P_2$ contributing to the received signal is marked by a green line extending from $P_2$ to the Rx antenna. In FIG. 42, both $P_1$ and $P_2$ follow the attached-point assumption. This is indicated by the fact that their original positions, marked with filled circles, and their extrapolated positions at t=Δt, marked with empty circles, form paths that are parallel to $v_1$ and $v_2$, respectively. That is, $P_1$ (t)=$P_1$ (0)+$v_1$Δt and $P_2$ (t)=$P_2$ (0)+$v_2$Δt. The attached-point assumption leads to one result for dR/dt for the received signal contribution due scattered fields radiated by surface currents impressed on $S_2$ by the ray hitting at $P_2$. In FIG. 43, $P_1$ continues to follow the attached-point assumption but $P_2$ is now assumed to follow the sliding-point assumption, leading to a different result for dR/dt for the same received signal contribution, thus causing that received signal contribution to be accumulated into different velocity bin(s) than it would have under the original assumption. With the sliding-point assumption, the modified constraint on the motion of $P_2$ is that it slides along $S_2$ such that the unit vector $\hat{u}_{2,1}$ from $P_1$ to $P_2$ remains unchanged from its original orientation at time t=0. In FIG. 42, where $P_2$ follows the attached-point assumption, the direction of $\hat{u}_{2,1}$ changes slightly between t=0 and t=Δt, while in FIG. 43, where $P_2$ follows the sliding-point assumption, the direction of $\hat{u}_{2,1}$ is independent of time. This is only possible because $P_2$ has been permitted to slide freely along $S_2$. Likewise, in FIG. 43, and contrary to depiction in FIG. 42, the path formed by $P_2$ in going from t=0 (filled dot) to t=$\Delta$t (unfilled circle) is not parallel to $v_2$: $P_2$ (t)=$P_2$ (0)+v'$_2$ t≠$P_2$ (0)+$v_2$ t, where v'$_2$ is some other velocity.

Under the original assumption that both $P_1$ and $P_2$ are attached to surfaces $S_1$ and $S_2$, respectively, the rate-of-change in the composite path length from Tx to $P_1$ to $P_2$ to Rx is given by $$\frac{dR}{dt} \langle (v_1 - v_{Tx}), \hat{u}_{1,Tx} \rangle + \langle (v_2 - v_1), \hat{u}_{2,1} \rangle + \langle (v_{Rx} - v_2), \hat{u}_{Rx,2} \rangle, \quad (5)$$

where <a, b> indicates the inner product of vectors a and b, $\hat{u}_{j,i}$ is the unit direction-vector for the ray segment from point i to point j, and $v_{Tx}$ and $v_{Rx}$ are the respective vector velocities of the Tx and Rx antennas. If we instead allow $P_2$ to slide along $S_2$ in the manner described above while still holding $P_1$ attached to $S_1$ as both surfaces move (and as Tx and Rx antennas also move), the rate-of-change in the composite path length is then given by $$\frac{dR}{dt} \langle (v_1 - v_{Tx}), \hat{u}_{1,Tx} \rangle + \langle (v'_2 - v_1), \hat{u}_{2,1} \rangle + \langle (v_{Rx} - v'_2), \hat{u}_{Rx,2} \rangle. \quad (6)$$

The only difference between Equations (5) and (6) is that sliding velocity v'$_2$ in Eq. (6) has been substituted for attached velocity $v_2$ in Eq. (5). This modified velocity can be expressed in terms of the surface velocities as $$v'_2 = v_1 - \frac{\langle (v_2 - v_1), \hat{n}_2 \rangle}{\langle \hat{u}_{2,1}, \hat{n}_2 \rangle} \hat{u}_{2,1}, \quad (7)$$

where $\hat{n}_2$ is the unit vector perpendicular to surface $S_2$ at point $P_2$. If the ray reflecting off surface at $P_2$ goes on to hit one or more additional surfaces, then v'$_2$ should also be substituted for $v_2$ in the chained extensions of Equations (5) and (6). Also, is straightforward to generalize Equations (6) and (7) to replace the attached-point assumption with the sliding-point assumption at any desired bounce along a multi-bounce ray track.

Figure 44:
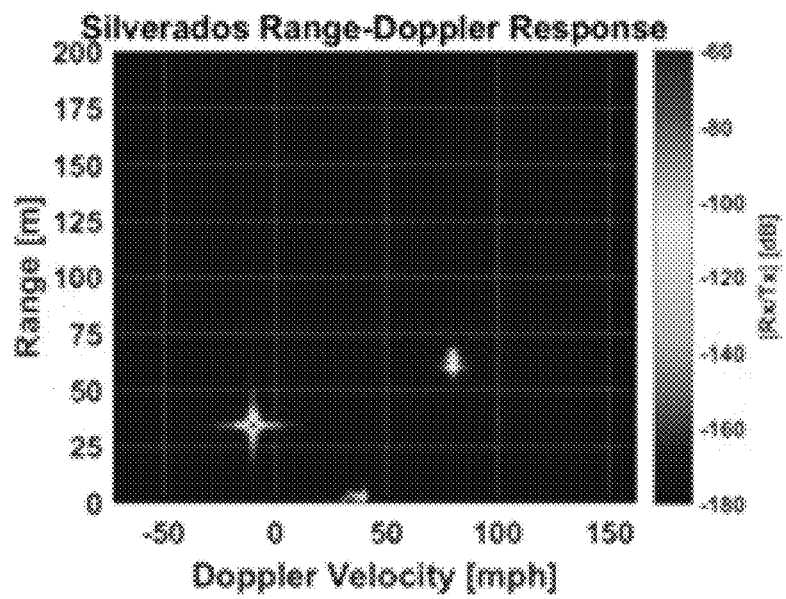
FIG. 44 provides updated range-Doppler images based on a re-simulation of Example 4.
Figure 44:
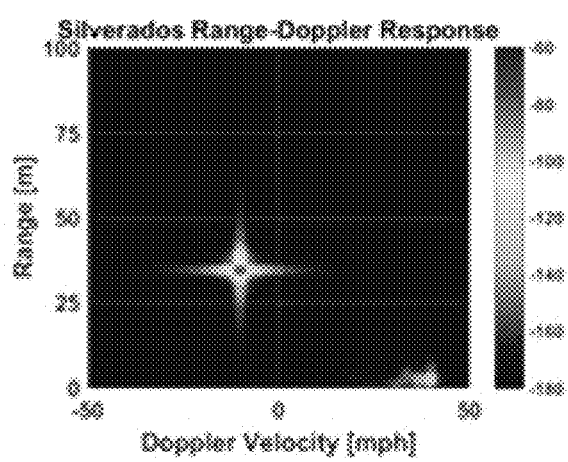
Figure 44:
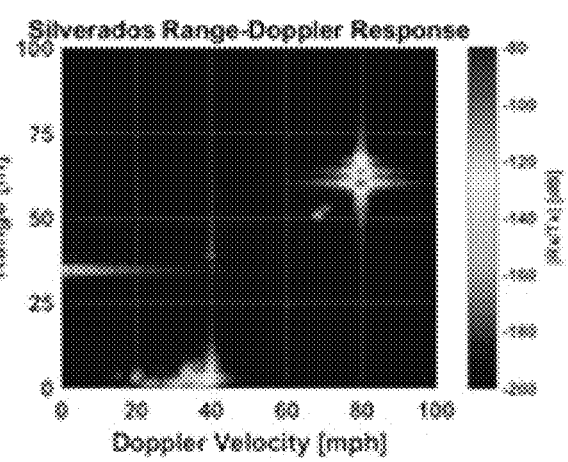

In one embodiment of ADP, the sliding-point assumption was implemented for any rays hitting the road surface on the second or higher bounces. The attached-point assumption was retained for rays hitting the road surface on the first bounce and for rays hitting any other surface on any bounce. Using this embodiment of ADP, the scenario in Example 4 was re-simulated to generate modified results, designated here as Example 5. The updated range-Doppler images are shown in FIG. 44. Comparing FIG. 44a with FIG. 40b, and also FIG. 44b with FIG. 41b and FIG. 44c with FIG. 41d, it is evident that the earlier identified trail of minor sub-features running horizontally between the relative velocities of the two trucks and the ground speed of the EGO vehicle (40 mph) have been largely, if not completely, eliminated by implementing the sliding-point assumption in the manner described. Detailed investigation of the ray paths and test simulations using simplified versions of the vehicles indicate that these sub-feature trails are caused by rays that first hit the trucks and then deflect downward to hit the road. Test simulations where the truck bodies have been removed and only the truck wheels and tires are retained indicate that rays deflecting off the lower halves of the wheels and then hitting the road are one significant source of these sub-features. Further analysis also shows that these sub-features are simulation artifacts that would not be observed in a measurement. These results indicate that judicious deployment of the sliding-point assumption in the manner described enhances ADP simulation accuracy. More generally, it makes sense to apply the sliding-point assumption whenever rays hit extended and smoothly-curved (or flat) surfaces on the second or higher bounces. Examples of such surfaces would include roads, sidewalks, smooth terrains, and smooth building walls.

Figure 45:
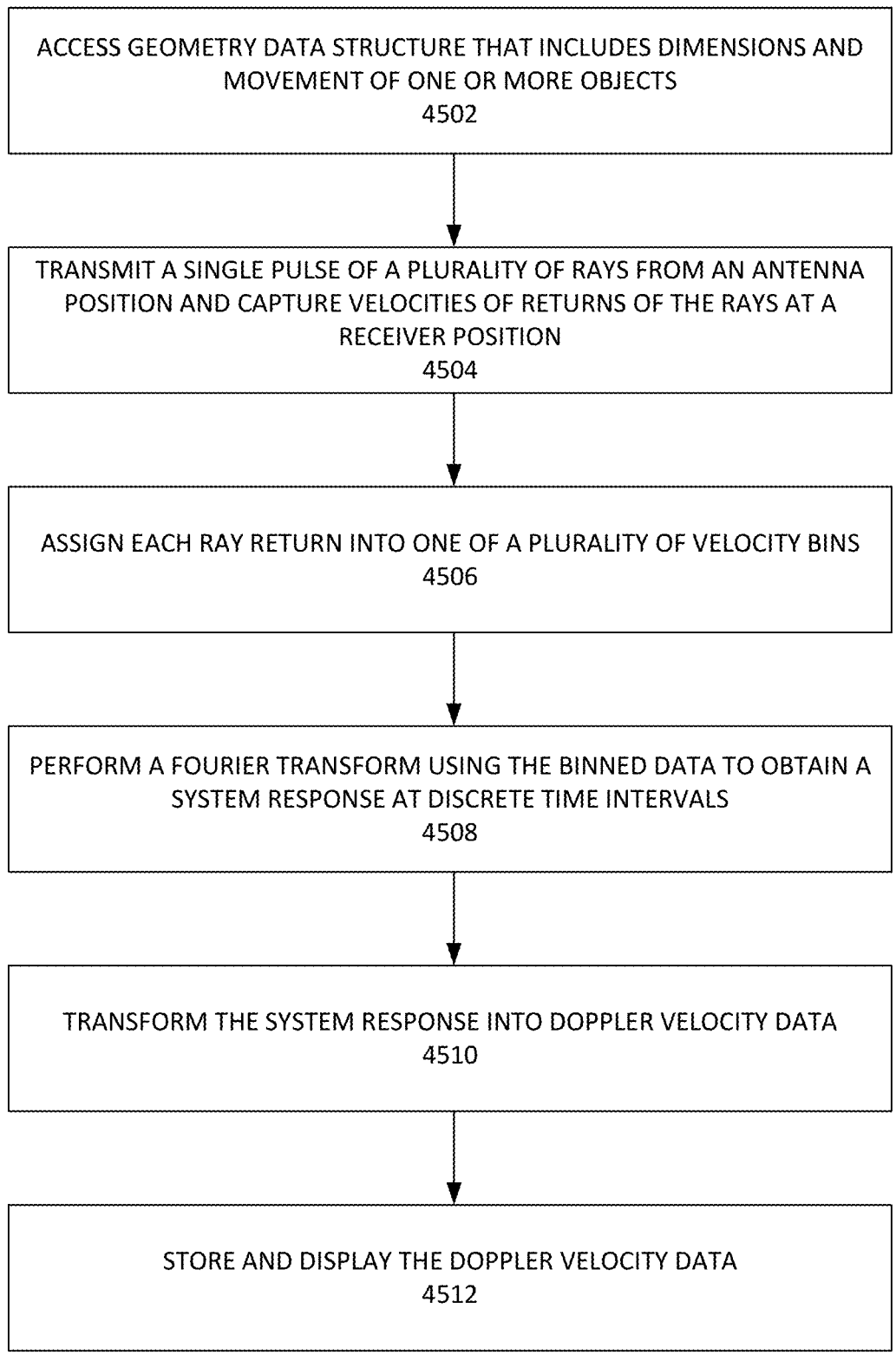
FIG. 45 depicts a computer-implemented method for generating a display of radar returns.

FIG. 45 depicts a computer-implemented method for generating a display of radar returns. A geometry data structure is accessed at 4502 that identifies characteristics of a region of interest that includes dimensions and movement of one or more objects in the region of interest. At 4504, a single pulse of a plurality of rays is transmitted from an antenna position into the region of interest and the velocities of returns of the rays are captured at a receiver position after the rays have interacted with the one or more objects. Each ray return is assigned at 4506 into one of a plurality of bins based on the velocity of that ray. At 4508, a Fourier transform is performed using the binned data to obtain a system response at discrete time intervals. The system response at the discrete time intervals is transformed at 4510 into Doppler velocity data, and the Doppler velocity data is stored and displayed on a graphical user interface at 4512.

For example, in one embodiment, a geometry data structure contains identifications of one or more objects in the region of interest during a simulation. That geometry data structure may further include size, shape, orientation, location and movement data associated with those objects. Movement data may include a direction, velocity, acceleration, where any of those movement data metrics may be constant or changing over time in a continuous or discontinuous manner. The geometry data structure may also contain metrics associated with an antenna transmitter position and a receiver position including their locations and movement during the simulation. Simulating the transmission of electromagnetic radar waveforms from the antenna and capturing their returns, as would be experienced in the real world, is performed in one example by transmitting a single pulse of a plurality of rays from the antenna position and capturing velocities of returns of the rays at the receiver position. In one embodiment, electromagnetic radar waves are simulated as a pattern of straight line rays approximating radar waves from the antenna position at a particular time in directions according to the pattern (e.g., according to a ray tracing procedure). Knowing the positions, orientations, movement, and other details of the objects in the region of interest and the propagation speed of the rays (e.g., at or near the speed of light, similar to actual radio waves), a simulation engine can determine how the radar wave, approximated by a ray, would interact with any objects in a straight line path of the ray, including characteristics of how the radar wave would be reflected to the receiver (e.g., a proportion of the radar wave that would be reflected, phase information). That reflection data is captured at the receiver by storing data indicative of the reflections (e.g., with which ray transmitted from the antenna a reflection is associated, a velocity of the ray return, a strength of the ray return, a phase of the ray return). Capturing a ray return may, in one embodiment, include determining whether or what portion of a ray return intersects with the location of the receiver. Data indicative of that ray return (e.g., an indication of the ray and one or more of ray velocity, ray proportion (e.g., 0 for ray returns that do not intersect with the receiver position after interaction with the one or more objects, 1 for ray returns that are reflected to the receiver location in their entirety, and fractional values indicating proportions of ray returns that intersect with the receiver position), and ray return phase data), is stored (e.g., in a ray return data structure). Each ray return is assigned at into one of a plurality of bins based on the velocity of that ray. A Fourier transform is performed using the binned data to obtain a system response at discrete time intervals. The system response at the discrete time intervals is transformed into Doppler velocity data, and the Doppler velocity data is stored and displayed on a graphical user interface in one example.

While systems and methods described herein have been described in certain examples with references to pulse-Doppler waveform radars, this application is applicable to a variety of Doppler-capable radars with different waveforms. For example, systems and methods described herein are applicable to advanced driver assistance systems (ADAS) and autonomous vehicle (AV) radar sensor applications that use other waveforms because they are more practical to implement in hardware. A common alternative waveform used in industry is chirp-sequence FMCW (frequency modulated continuous wave). Unlike pulse-Doppler, chirp-sequence FMCW is transmitting near continuously instead of in a very narrow pulse, so it has much lower peak-power requirements and is therefore more practical to implement in commercial hardware. But the way the received signals are handled, it ultimately becomes like pulse-Doppler and therefore is eventually processed into range-Doppler imagery in a similar way.

Systems methods described herein and data generated using those systems and methods can be utilized in a variety of contexts. As described above, the systems and methods can be used to simulate, store, and display radar results as they would be generated by a physical radar system operating in the described region of operation. In one example, Doppler velocity data generated herein is provided to a simulated autonomous vehicle. That simulated autonomous vehicle is configured to make a driving decision based on that provided Doppler velocity data as an approximation of how the autonomous vehicle and its integrated radar would behave in a corresponding physical environment. In one example, the one or more objects in the simulated environment include a vehicle, a pedestrian, a bicycle, a road sign, a road, and other natural or man-made objects. In one example, the Doppler velocity data is provided to a simulated vehicle that is not fully autonomous, where the vehicle is configured to make a driving assistance decision (e.g., braking, lane assist) based on the Doppler velocity data. In another example, Doppler velocity data as generated by systems and methods herein is provided to an autonomous vehicle decision making module as training data. That autonomous vehicle decision making module then controls a physical vehicle based in part on the training data. In a further example, systems and methods as used herein can be utilized in a micro-Doppler implementation. In one such implementation, Doppler processing is utilized to isolate a moving object behind other objects, such as a person walking or breathing behind a wall. Simulation of the performance of such systems can be performed using a ray-tracing simulation, such that ADP systems and methods described herein can be beneficial.

Systems and methods as described herein may be performed by a simulator, which may take the form of a computer-implemented simulation engine for executing a simulation, such as through the use of software instructions stored on a non-transitory computer-readable medium. A simulation, in one embodiment, is a computer-implemented imitation of a real-world process or system using one or more models. The models, in that example, represent characteristics, behaviors, and functions of selected physical systems or processes (e.g., the behavior of the one or more objects in the region of interest, the behavior of radar waves approximated by one or more rays transmitted in the simulation). The models represent behaviors of the system, while the simulation represents the operation of the system over time.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method for simulating radar returns in a region of interest, comprising:
   accessing a geometry data structure that identifies characteristics of the region of interest in which a radar system is to be simulated that includes dimensions and movement of one or more objects in the region of interest;
   receiving data specifying characteristics of the radar system to be simulated;
   simulating, using the geometry data structure and the received data specifying characteristics of the radar system, transmission of a pulse of a plurality of rays from an antenna position into the region of interest and capturing, at a receiver position, returns of the rays after the rays have interacted with the one or more objects, wherein the returns of the rays are captured with rates of change in ray path lengths based on the velocity of an antenna launching the rays, the velocities of object surfaces hit by the transmitted rays, and the velocities of the receivers, wherein the transmitting is performed by a simulator that is simulating the region of interest as a simulated environment;
   assigning each ray return into one of a plurality of bins based on a rate of change of that ray, wherein each bin represents a different range of values for the rates of change;
   performing a Fourier transform using the binned data to obtain a system response at discrete time intervals;
   transforming the system response at the discrete time intervals into Doppler velocity data; and
   storing the Doppler velocity data and displaying the Doppler velocity data on a graphical user interface.

2. The method of claim 1, wherein the Doppler velocity data is displayed as a graph relative to detected ranges of the one or more objects in the region of interest.

3. The method of claim 1, wherein the Fourier transform is a forward discrete Fourier transform that provides system response data for time intervals prior to t0, wherein t0 corresponds to a time when the pulse was transmitted,
   the method further comprising:
      performing an inverse discrete Fourier transform using the binned data to obtain system response data for time intervals after t0.

4. The method of claim 1, wherein the geometry data structure includes data that identifies movement of the one or more objects in the region of interest prior to and after t0.

5. The method of claim 1, wherein a particular ray return is partially assigned to multiple bins.

6. The method of claim 1, further comprising:
   filtering the system response data at the discrete time intervals such that a portion of system response data representing the larger deviations from reference time t0 are excluded from said transforming.

7. The method of claim 1, further comprising:
   determining thresholds for the plurality of bins based on a center frequency of a radar, a number of pulses in a coherent processing interval of the radar, and a length of time associated with the coherent processing interval.

8. The method of claim 1, wherein the rates of velocities are determined based on movement of the one or more objects at a time other than t0.

9. The method of claim 1, wherein the Doppler velocity data is generated using only a single pulse of rays with each single pulse at a center of a coherent processing interval (CPI), the Doppler velocity data being extrapolated from the single pulse of rays and being indicative of returns from multiple pulses of rays over the CPI.

10. The method of claim 9, wherein the display of the Doppler velocity data exhibits reduced mismatched-ray artifacts compared to analysis of all rays transmitted during the coherent processing interval.

11. The method of claim 9, wherein the pulse of rays is transmitted at a time t0 corresponding to a center of the coherent processing interval.

12. The method of claim 1, wherein the region includes multiple objects, wherein the Doppler velocity data is simultaneously displayed relative to detected ranges of each of the multiple objects in the region of interest.

13. The method of claim 1, wherein the Doppler velocity data is provided to a simulated autonomous vehicle, wherein the simulated autonomous vehicle is configured to make a driving decision based on the Doppler velocity data.

14. The method of claim 13, wherein the one or more objects include one or more of a vehicle, a pedestrian, a bicycle, a road sign, a road, and other natural or man-made objects in the field of view of the radar.

15. The method of claim 13, wherein the movement data for one of the one or more objects includes direction data, velocity data, and rotation data.

16. The method of claim 13, wherein the Doppler velocity data is provided to an autonomous vehicle decision making module as training data.

17. The method of claim 1, wherein the Doppler velocity data is provided to a simulated vehicle that is not fully autonomous, wherein the vehicle is configured to make a driving assistance decision based on the Doppler velocity data.

18. The method of claim 1, wherein the method is implemented using a multi-core graphics processing unit, wherein the Doppler velocity data is determined in real-time relative to a corresponding radar unit.

19. The method of claim 1, wherein the one or more objects, the antenna position, and the receiver position are moving relative to one another over time.

20. The method of claim 1, wherein the ray path lengths are stretched or compressed according to the velocity of the antenna and the one or more objects in the region of interest.

21. The method of claim 1, wherein the rate of change in ray path lengths is determined by enforcing an assumption that each ray hit point is attached to the moving surface point where it has hit and without any relative motion to that surface point.

22. The method of claim 1, wherein the rate of change in ray path lengths is determined by enforcing an assumption that some of the ray hit points will freely slide along the moving surfaces they have hit while maintaining the incident ray direction unchanged.

23. The method of claim 1, wherein rays hitting extended and smoothly curved or flat surfaces on the second bounce or higher are handled according to the method of claim 22.

24. The method of claim 1, wherein the radar returns are pulse Doppler radar returns or FMCW Doppler radar returns.

25. The method of claim 1, wherein the plurality of bins are uniform in width and optimized in number for a Fourier transform, wherein said Fourier transform is a fast Fourier transform.

26. The method of claim 1, wherein said transmitting calculates interactions of the plurality of rays originating from the antenna position into the region of interest and captures at the receiver position the velocities of returns of the rays after the rays have interacted with the one or more objects in the simulated region of interest.

27. A computer-implemented system for simulating radar returns in a region of interest, comprising:
  one or more data processors;
  one or more computer-readable mediums encoded with instructions for commanding the one or more data processors to execute steps of a process that includes:
    accessing a geometry data structure that identifies characteristics of the region of interest in which a radar system is to be simulated that includes dimensions and movement of one or more objects in the region of interest;
    receiving data specifying characteristics of the radar system to be simulated;
    simulating, using the geometry data structure and the received data specifying characteristics of the radar system, transmission of a pulse of a plurality of rays from an antenna position into the region of interest and capturing, at a receiver position, returns of the rays after the rays have interacted with the one or more objects, wherein the returns of the rays are captured with rates of change in ray path lengths based on the velocity of an antenna launching the rays, the velocities of object surfaces hit by the transmitted rays, and the velocities of the receivers, wherein the transmitting is performed by a simulator that is simulating the region of interest as a simulated environment;
    assigning each ray return into one of a plurality of bins based on a rate of change of that ray, wherein each bin represents a different range of values for the rates of change;
    performing a Fourier transform using the binned data to obtain a system response at discrete time intervals;
    transforming the system response at the discrete time intervals into Doppler velocity data; and
    storing the Doppler velocity data and displaying the Doppler velocity data on a graphical user interface.

28. A computer-readable, non-transitory medium encoded with instructions for commanding one or more data processors to execute steps of a method for simulating radar returns in a region of interest, the method comprising:
  accessing a geometry data structure that identifies characteristics of the region of interest in which a radar system is to be simulated as part of a simulation, the geometry data structure including data specifying dimensions and movement of one or more objects in the region of interest as part of the simulation and data specifying a position of an antenna transmitter, a position of a receiver, and movement of the transmitter and the receiver as part of the simulation;
  receiving data specifying characteristics of the radar system;
  simulating, using the geometry data structure and the received data specifying characteristics of the radar system, transmission of a pulse of a plurality of rays from an antenna position into the region of interest and capturing, at a receiver position, returns of the rays after the rays have interacted with the one or more objects, wherein the returns of the rays are captured with rates of change in ray path lengths based on the velocity of an antenna launching the rays, the velocities of object surfaces hit by the transmitted rays, and the velocities of the receivers, wherein the transmitting is performed by a simulator that is simulating the region of interest as a simulated environment;
  assigning each ray return into one of a plurality of bins based on a rate of change of that ray, wherein each bin represents a different range of values for the rates of change;
  performing a Fourier transform using the binned data to obtain a system response at discrete time intervals;
  transforming the system response at the discrete time intervals into Doppler velocity data by extrapolating a single pulse of rays to be indicative of returns from multiple pulse of rays over a coherent processing interval (CPI); and
  storing the Doppler velocity data and displaying the Doppler velocity data on a graphical user interfaces;
  wherein the characteristics of the radar system comprise: radar type, radar waveform, length of CPI of the radar system, a number of pulses per CPI, and a frequency of the radar system.

* * * * *